(12) United States Patent
Nishikawa

(10) Patent No.: US 11,444,351 B2
(45) Date of Patent: Sep. 13, 2022

(54) ENERGY STORAGE APPARATUS

(71) Applicant: GS Yuasa International Ltd., Kyoto (JP)

(72) Inventor: Ryutaro Nishikawa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 1 day.

(21) Appl. No.: 16/980,705

(22) PCT Filed: Feb. 28, 2019

(86) PCT No.: PCT/JP2019/007812
§ 371 (c)(1),
(2) Date: Sep. 14, 2020

(87) PCT Pub. No.: WO2019/176560
PCT Pub. Date: Sep. 19, 2019

(65) Prior Publication Data
US 2021/0013461 A1 Jan. 14, 2021

(30) Foreign Application Priority Data

Mar. 16, 2018 (JP) .............................. JP2018-049050
Mar. 16, 2018 (JP) .............................. JP2018-049312

(51) Int. Cl.
*H01M 50/147* (2021.01)
*H01M 50/10* (2021.01)
(Continued)

(52) U.S. Cl.
CPC ......... *H01M 50/147* (2021.01); *H01M 50/10* (2021.01); *H01M 50/148* (2021.01); *H01M 50/20* (2021.01)

(58) Field of Classification Search
CPC .... H01M 50/147; H01M 50/10; H01M 50/20; H01M 50/148
See application file for complete search history.

(56) References Cited

U.S. PATENT DOCUMENTS 7,597,992 B2 10/2009 Kanai et al.
9,153,806 B2 10/2015 Yoshioka et al.
(Continued)

FOREIGN PATENT DOCUMENTS

JP S63-18867 U 2/1988
JP H05-217597 A 8/1993
(Continued)

OTHER PUBLICATIONS

International Search Report (ISR) (PCT Form PCT/ISA/210), in PCT/JP2019/007812, dated May 28, 2019.

*Primary Examiner* — Jane J Rhee
(74) *Attorney, Agent, or Firm* — McGinn I.P. Law Group, PLLC.

(57) ABSTRACT

An energy storage apparatus includes: an outer case having a box-shaped outer case and a lid covering one side of the outer case body in a predetermined direction; and an inner lid disposed on one side of one end portion of the energy storage device on the one side in the predetermined direction. The outer case body includes a pair of first side walls facing each other, and a pair of first fixing portions that are respectively provided on the pair of first side walls and attach the inner lid. The inner lid includes a pair of second fixing portions that are respectively connected with the pair of first fixing portions and are arranged at a predetermined distance from each other. The outer case body and the inner lid are fixed by connecting the pair of first fixing portions and the pair of second fixing portions with each other.

20 Claims, 12 Drawing Sheets

(51) Int. Cl.
*H01M 50/20* (2021.01)
*H01M 50/148* (2021.01)

(56) References Cited

U.S. PATENT DOCUMENTS

| | | |
|---|---|---|
| 9,252,406 B2 | 2/2016 | Kusunoki |
| 9,425,446 B2 | 8/2016 | Watanabe et al. |
| 9,515,306 B2 | 12/2016 | Kusunoki |
| 9,755,199 B2 | 9/2017 | Tononishi |
| 10,593,913 B2 | 3/2020 | Miyawaki |
| 2008/0171259 A1 | 7/2008 | Kanai et al. |
| 2013/0183573 A1 | 7/2013 | Yoshioka et al. |
| 2014/0087229 A1 | 3/2014 | Watanabe et al. |
| 2014/0093765 A1 | 4/2014 | Kusunoki |
| 2016/0093855 A1 | 3/2016 | Tononishi |
| 2016/0141570 A1 | 5/2016 | Kusunoki |
| 2016/0336556 A1* | 11/2016 | Okutani ............... H01M 50/213 |
| 2018/0102573 A1 | 4/2018 | Tsuruta et al. |
| 2018/0315967 A1 | 11/2018 | Miyawaki |
| 2018/0358587 A1 | 12/2018 | Tononishi |

FOREIGN PATENT DOCUMENTS

| | | |
|---|---|---|
| JP | 2001-135288 A | 5/2001 |
| JP | 2013-168356 A | 8/2013 |
| JP | 2014-067648 A | 4/2014 |
| JP | 2014-197513 A | 10/2014 |
| JP | 2014-197516 A | 10/2014 |
| JP | 2015-122335 A | 7/2015 |
| JP | 2016-025037 A | 2/2016 |
| JP | 2016-072230 A | 5/2016 |
| JP | 2017-004871 A | 1/2017 |
| JP | 2017-016888 A | 1/2017 |
| JP | 2017-117621 A | 6/2017 |
| JP | 2018-063838 A | 4/2018 |
| WO | WO 2005/096412 A1 | 10/2005 |
| WO | WO 2017/047683 A1 | 3/2017 |

* cited by examiner

ENERGY STORAGE APPARATUS

TECHNICAL FIELD

The present invention relates to an energy storage apparatus.

BACKGROUND ART

An energy storage apparatus of Patent Document 1 includes an energy storage device and an outer case that accommodates the energy storage device. The outer case includes a box-shaped outer case body made of resin, and a lid mounted on the outer case body.

When this type of outer case body is injection-molded, the outer case body may be deformed so as to warp inward due to factors such as residual stress generated by pressure during injection molding or uneven volume contraction. When the outer case body is deformed in such a way, it becomes difficult to mount the lid on the outer case body, and thus the assemblability of the outer case deteriorates.

In Patent Document 1, the outer case body includes a pair of side walls facing each other and a partition plate that connects the pair of side walls, and the partition plate supports the side walls so as to suppress deformation of the side walls in forming the outer case body.

PRIOR ART DOCUMENTS

Patent Documents

Patent Document 1: JP-A-2014-197516
Patent Document 2: JP-A-2013-168356

SUMMARY OF THE INVENTION

Problems to be Solved by the Invention

However, in Patent Document 1, the partition plate is provided so as to divide the space inside the outer case body into a plurality of spaces, and the space for accommodating the energy storage device is reduced, so that the volume energy density lowers.

It is a first object of the present invention to provide an energy storage apparatus that prevents or suppresses deformation of an outer case body while ensuring the volume energy density of the energy storage apparatus.

Means for Solving the Problems

An energy storage apparatus according to an aspect of the present invention includes: an energy storage device; an outer case having a box-shaped outer case body that accommodates the energy storage device, and a lid that covers one side of the outer case body in a predetermined direction; and a substantially plate-shaped inner lid disposed on one side of an end of the energy storage device on the one side in the predetermined direction, in which the outer case body includes: a pair of first side walls facing each other; a pair of second side walls that face each other and connect the pair of first side walls to each other; and a pair of first fixing portions that are respectively provided on the pair of first sidewalls and attach the inner lid, the inner lid includes a pair of second fixing portions that are respectively connected with the pair of first fixing portions and are arranged at a predetermined distance from each other, the outer case body and the inner lid are fixed by connecting the pair of first fixing portions and the pair of second fixing portions to each other, and the inner lid and the energy storage device are bonded to each other.

Advantages of the Invention

It is possible with the present invention to prevent or suppress deformation of the outer case body while ensuring the volume energy density of the energy storage apparatus.

MODE FOR CARRYING OUT THE INVENTION

Figure 1:
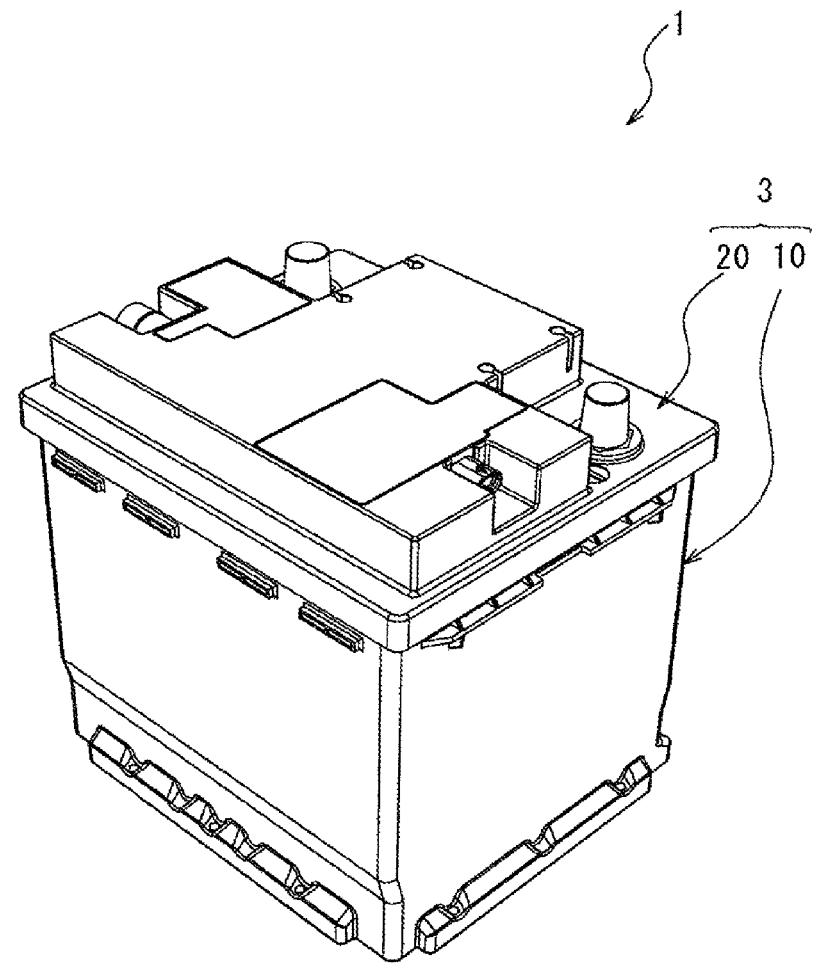
FIG. 1 is a perspective view of an energy storage apparatus according to a first embodiment of the present invention.
Figure 1:
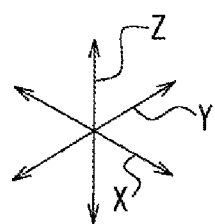

An energy storage apparatus according to an aspect of the present invention includes: an energy storage device; an outer case having a box-shaped outer case body that accommodates the energy storage device, and a lid that covers one side of the outer case body in a predetermined direction; and a substantially plate-shaped inner lid disposed on one side of an end of the energy storage device on the one side in the predetermined direction, in which the outer case body includes: a pair of first side walls facing each other; a pair of second side walls that face each other and connect the pair of first side walls to each other; and a pair of first fixing portions that are respectively provided on the pair of first sidewalls and attach the inner lid, the inner lid includes a pair of second fixing portions that are respectively connected with the pair of first fixing portions and are arranged at a predetermined distance from each other, and the outer case body and the inner lid are fixed by connecting the pair of first fixing portions and the pair of second fixing portions to each other.

According to this configuration, the distance between the pair of first fixing portions is defined by a predetermined distance between the pair of second fixing portions. Therefore, even if the pair of first side walls are deformed during injection molding, it is possible to prevent or suppress deformation of the pair of first side walls of the outer case body by appropriately maintaining the distance between the pair of first side walls. Since the inner lid is disposed on one side of one end of the energy storage device, the volume of the space for accommodating the energy storage devices in the outer case body can be ensured, and the volume energy density of the energy storage device can be ensured.

The outer case body may include a bottom wall having a substantially quadrangular shape and connected to the pair of first side walls and the pair of second side walls, and the pair of first side walls may be walls extending along the array direction of a plurality of the energy storage devices, or walls extending in a direction orthogonal to the array direction.

When the outer case body accommodates a plurality of energy storage devices, the first side walls may be long side surfaces depending on the array direction or the number of the energy storage devices, or the size of a case of the energy storage devices. In a case where the plurality of energy storage devices are arranged along the first side walls, the first side walls are walls extending along a direction in which the plurality of energy storage devices are arranged, and may be long side surfaces. Since the long side surfaces are more likely to be deformed during injection molding than the short side surfaces, it is possible to effectively prevent or suppress deformation of the pair of first side walls of the outer case body by appropriately maintaining the distance between the long side surfaces by the pair of first fixing portions and the pair of second fixing portions. In a case where the plurality of energy storage devices are arranged along the second side walls, the first side walls are walls extending along a direction orthogonal to the array direction of the plurality of energy storage devices, and may be short side surfaces. At this time, since the first fixing portions to be fixed to the inner lid are provided on the first side walls, it is possible to effectively prevent or suppress deformation of the first side walls pressed by the expanded energy storage devices.

The pair of first fixing portions may be respectively disposed at central portions of the pair of first side walls in a direction in which the pair of first side walls extend in a cross section intersecting the predetermined direction.

The central portions of the pair of first side walls are more likely to be deformed during injection molding than end portions connected respectively to the pair of second side walls. Therefore, it is possible to effectively prevent or suppress deformation of the pair of first side walls of the outer case body by appropriately maintaining the distance between the central portions of the pair of first side walls by the pair of first fixing portions and the pair of second fixing portions.

The outer case body may include a pair of extension portions respectively extending from inner surfaces of the pair of first side walls, and the pair of first fixing portions may be respectively provided in the pair of extension portions.

The pair of extension portions may be reinforcing ribs provided on the outer case body.

With this configuration where the pair of extension portions are constituted of reinforcing ribs, it is unnecessary to provide reinforcing ribs separately from the pair of extension portions, and space saving can be realized.

The outer case body and the lid may include a heat-welded joint portion. The pair of first fixing portions provided on the pair of first side walls and the pair of second fixing portions provided on the inner lid may form a fixing portion of the outer case body and the inner lid. In the predetermined direction, a position of the fixing portion on the lid side may be located closer to the energy storage device than the joint portion.

With this configuration where the position of the fixing portion on the lid side is located closer to the energy storage device than the joint portion in the predetermined direction, it is possible to prevent a hot plate used for heat-welding the outer case body and the lid from interfering with the fixed portion.

The inner lid and the energy storage device may be bonded to each other.

With this configuration where the inner lid is bonded to the energy storage device, it is possible to suppress warp deformation of the inner lid, and it is thus possible to appropriately maintain the distance between the pair of first side walls, and to effectively prevent or suppress deformation of the pair of first side walls of the outer case body.

One of the pair of first fixing portions and the pair of second fixing portions have a pin while the other have an insertion hole, and a tip portion of the pin may be heat-caulked with the pin penetrating the insertion hole.

According to this structure, a tip portion of a pin inserted into an insertion hole is heat-caulked, and accordingly the outer case body and the inner lid are coupled to each other. Therefore, the outer case body and the inner lid can be firmly coupled to each other, and the work for coupling is facilitated as compared with a case where the outer case body and the inner lid are coupled using bolts. Even when the outer case is provided with a plurality of combinations of pins and insertion holes, it is possible to heat-caulk the plurality of pins simultaneously or substantially simultaneously. Therefore, it is possible to improve the coupling force between the outer case body and the inner lid, and to efficiently manufacture an energy storage apparatus. The energy storage apparatus having the above structure is an energy storage apparatus with a simple configuration and high reliability.

The pair of second fixing portions having the insertion holes are formed in a peripheral edge of the inner lid, and the pair of first fixing portions having the pins may be formed at positions of the outer case body facing the peripheral edges of the inner lid so as to project toward the inner lid.

With this configuration, the tip of the pin can be heat-caulked from above with the pin of the outer case body penetrating the insertion hole of the inner lid. That is, the work of heat caulking can be easily performed. Accordingly, the accuracy of the work is improved, and as a result, the reliability of the energy storage apparatus is improved.

A plurality of the pins are provided on one of the pair of first fixing portions and the pair of second fixing portions, and the plurality of pins may be disposed at positions that do not have rotational symmetry with respect to the center of the one of the outer case body and the inner lid when viewing the one in plan.

According to this configuration, a plurality of the holes provided on the other of the first fixing portion and the second fixing portion are also disposed at positions that do not have rotational symmetry with respect to the center of the other. Accordingly, the one-to-one relationship between the plurality of pins and the plurality of insertion holes is uniquely determined, so that it is easy to determine the orientation (posture) of the inner lid with respect to the outer case body when the inner lid is disposed on the outer case body. That is, in a case where the shape of the inner lid in plan view is a rotationally symmetric shape such as a regular polygon, it is possible to reduce the possibility that the inner lid is disposed (misplacement) on the outer case body in an erroneous orientation (posture). Therefore, an event such as lowering of the manufacturing efficiency due to misplacement or damage to a member due to misplacement, which may cause lowering of the reliability of the energy storage apparatus, is unlikely to occur.

A plurality of the pins are provided on one of the pair of first fixing portions and the pair of second fixing portions, and the shape in plan view, the size, or the posture of one of the plurality of pins may be different from the shape in plan view, the size, or the posture of one or more other pins.

With this configuration where a combination of one of the plurality of pins and one of the plurality of insertion holes is uniquely determined, it is easy to determine the orientation (posture) of the inner lid with respect to the outer case body when the inner lid is disposed on the outer case body. That is, in a case where the shape of the inner lid in plan view is a rotationally symmetric shape such as a regular polygon, the possibility that the inner lid is disposed (misplacement) in an erroneous orientation (posture) on the outer case body is reduced. Therefore, an event such as lowering of the manufacturing efficiency due to misplacement or damage to a member due to misplacement, which may cause lowering of the reliability of the energy storage apparatus, is unlikely to occur.

The inner lid has a substantially rectangular shape in plan view, and one of the pair of first fixing portions and the pair of second fixing portions may be provided with N (N is a positive odd number) pins.

For example, assume that the shape of the inner lid in plan view is a shape that is recognized as a rectangle as a whole, and that three holes into which the pins of the outer case body are inserted are disposed at the peripheral edge of the inner lid. In this case, the inner lid has rotational symmetry at every 180°, while it is impossible to dispose the three pins on the outer case body so as to have rotational symmetry at every 180°. That is, the arrangement positions of the three pins at the outer case body are positions that do not have rotational symmetry at every 180°. Accordingly, misplacement of the inner lid with respect to the outer case body does not occur.

First Embodiment

[Configuration of Energy Storage Apparatus]

The following description will explain the first embodiment of the present invention with reference to the accompanying drawings. The embodiments and a modification example thereof described below are all comprehensive or specific examples. Numerical values, shapes, materials, components, arrangement positions of components, connection forms, and the like illustrated in the following embodiments and the modification example thereof are merely examples, and are not intended to limit the present invention. Among components in the following embodiments and the modification example thereof, components not described in independent claims are described as arbitrary components. In each figure, dimensions or the like are not strictly shown.

In the following description, the length direction, the width direction, and the height direction of an energy storage apparatus 1 of the present embodiment may be respectively referred to as the X direction, the Y direction, and the Z direction. Specifically, the alignment direction of the energy storage devices, the facing direction of a long side surface of a case of the energy storage devices, or the thickness direction of the case is defined as the X-direction. The alignment direction of electrode terminals in one energy storage device, or the facing direction of a short side surface of a case of the energy storage devices is defined as the Y direction. The alignment direction of the outer case body and the inner lid in the outer case of the energy storage apparatus, the alignment direction of the energy storage device and the bus bar, or the vertical direction is defined as the Z direction. The X direction, the Y direction, and the Z direction are directions that intersect with each other (orthogonally in the following embodiments and the modification example thereof). These directions indicate directions in the posture of the energy storage apparatus 1 illustrated in the accompanying drawings, and do not necessarily coincide with a direction in an actual use state.

With reference to FIG. 1, the energy storage apparatus 1 according to the present embodiment includes a plurality of (eight in the present embodiment) energy storage devices 2 (illustrated in FIG. 2), and a hollow outer case 3 that accommodates the plurality of energy storage devices 2. The outer case 3 includes an outer case body 10 that accommodates the plurality of energy storage devices 2, and a lid 20 that covers one side (upper side in FIG. 1) of the outer case body in the Z direction (predetermined direction). The outer case body 10 and the lid 20 of the present embodiment are fixed by heat welding as will be described later.

The energy storage apparatus 1 is an apparatus that can charge electricity from the outside and discharge electricity to the outside. For example, the energy storage apparatus 1 is a battery module used for power storage or power supply. Specifically, the energy storage apparatus 1 is used as, for example, a battery for driving or engine starting of a moving body including a motor vehicle such as an electric vehicle (EV), a hybrid electric vehicle (HEV), a plug-in hybrid electric vehicle (PHEV), or a gasoline car, a motorcycle, a watercraft, a snowmobile, an agricultural machine, a construction machine, and an electric railway vehicle such as a train, a monorail, or a linear motor car, or as a stationary battery to be used for home use or for a generator.

Figure 2:
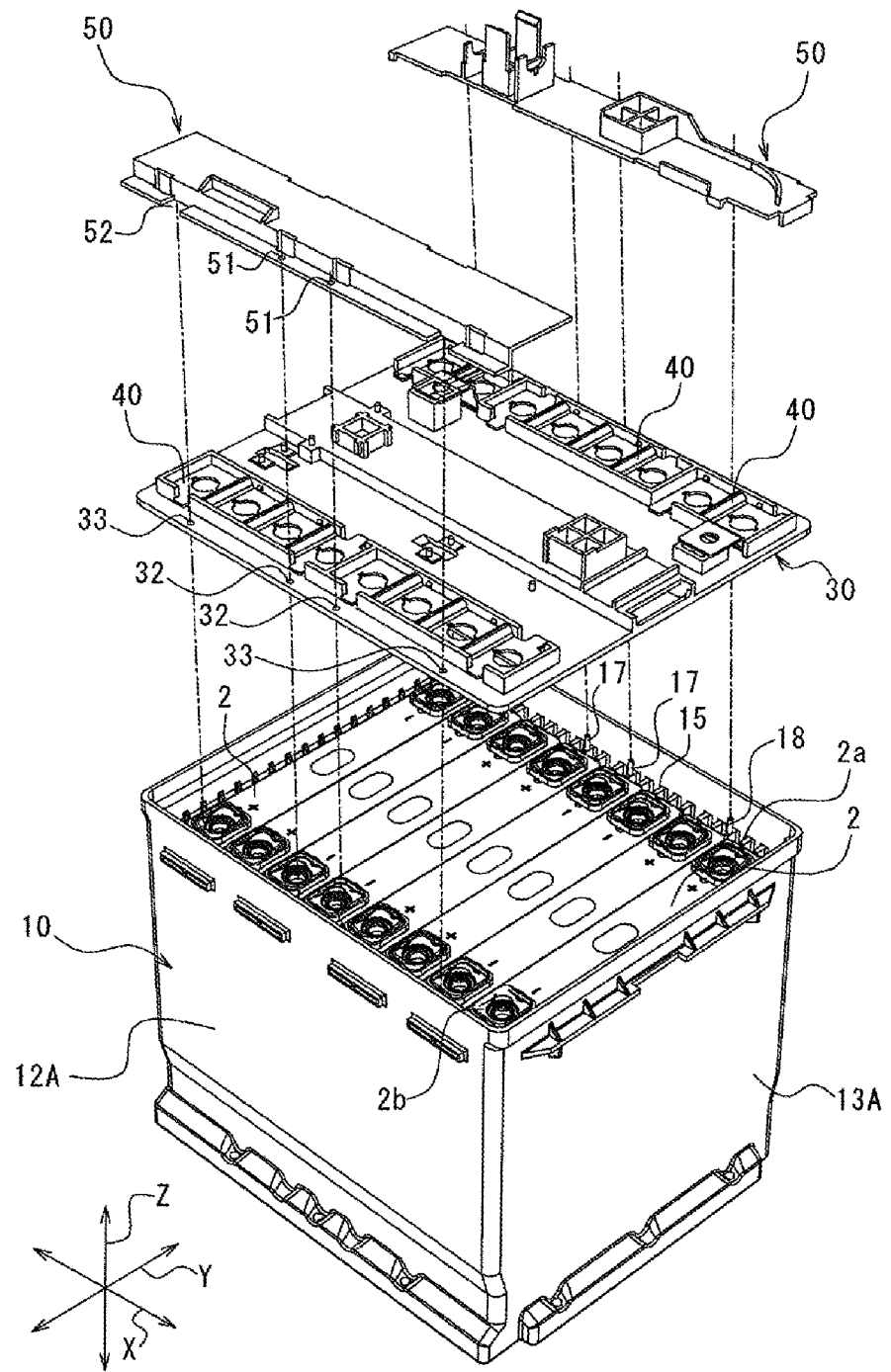
FIG. 2 is an exploded perspective view of the energy storage apparatus according to the first embodiment.
Figure 3:
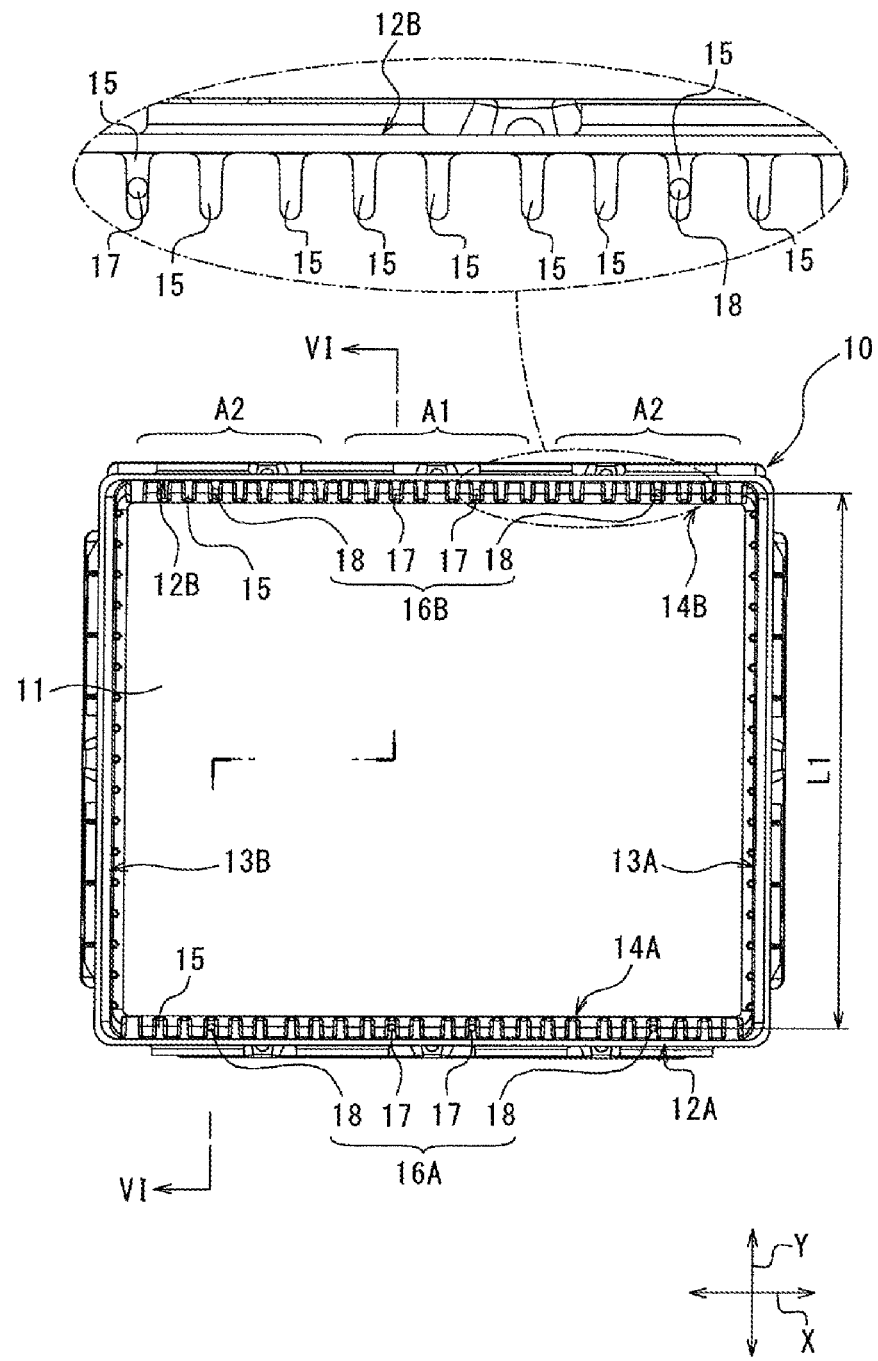
FIG. 3 is a plan view of an outer case body according to the first embodiment.

With reference to FIG. 2, the energy storage apparatus 1 includes a substantially plate-shaped inner lid 30 provided on one side in the Z direction of an end of the energy storage device 2 on the one side (upper side in FIG. 2) in the Z direction. The energy storage apparatus 1 includes a plurality of bus bars 40 that electrically connect adjacent energy storage devices 2 to each other, and a bus bar cover 50 disposed to cover the bus bars 40 from one side in the Z direction. In FIG. 3, components (e.g., a circuit board) other than the energy storage device 2, the inner lid 30, the bus bar 40, and the bus bar cover 50 are not shown.

Each energy storage device 2 of the present embodiment is a nonaqueous electrolyte secondary battery such as a lithium ion secondary battery, and is a prismatic battery. The plurality of energy storage devices 2 are aligned in the X direction and accommodated in the outer case body 10. Each energy storage device 2 includes a positive electrode terminal 2a and a negative electrode terminal 2b on an end surface on one side in the Z direction. The shape of the energy storage device 2, and the number of the energy storage devices 2 to be aligned are not limited. The energy storage device 2 is not limited to a nonaqueous electrolyte secondary battery, and may be a secondary battery other than a non-aqueous electrolyte secondary battery, or may be a capacitor. The energy storage device 2 may be a primary battery that can use stored electricity without the user having to charge electricity. The energy storage device 2 may be a battery that uses a solid electrolyte. The shape of the energy storage device 2 is not limited to a prismatic shape, and may be a cylindrical shape, an oblong cylindrical shape, a polygonal prism shape other than a rectangular parallelepiped shape, or the like.

The outer case body 10 is a box-shaped member obtained by injection-molding a resin. With reference also to FIG. 3, the outer case body 10 of the present embodiment includes a bottom wall 11, a pair of first side walls 12A and 12B facing each other, and a pair of second side walls 13A and 13B that face each other and connect the pair of first side walls 12A and 12B with each other. The pair of first side walls 12A and 12B and the pair of second side walls 13A and 13B form an opening on one side of the outer case body 10 in the Z direction.

The outer case body 10 and the lid 20 of the outer case 3 are made of an insulating material such as, for example, polycarbonate (PC), polypropylene (PP), polyethylene (PE), polystyrene (PS), polyphenylene sulfide resin (PPS), polyphenylene ether (PPE (including modified PPE)), polyethylene terephthalate (PET), polybutylene terephthalate (PBT), polyamide resin, polyether ether ketone (PEEK), tetrafluoroethylene-perfluoroalkyl vinyl ether (PFA), polytetrafluoroethylene (PTFE), polybutylene terephthalate (PBT), polyether sulfone (PES), ABS resin, or a composite material thereof. Accordingly, the outer case 3 prevents the energy storage device 2 or the like from coming into contact with an external metal member or the like.

The bottom wall 11 has a substantially quadrangular shape and is disposed on a plane (XY plane) perpendicular to the Z direction. Specifically, the bottom wall 11 of the present embodiment has a substantially rectangular shape and includes a pair of long sides extending in the X direction and a pair of short sides extending in the Y direction.

The pair of first side walls 12A and 12B of the present embodiment have a substantially rectangular shape, and are disposed on a plane (XZ plane) perpendicular to the Y direction. That is, the pair of first side walls 12A and 12B are walls extending along the array direction (X direction) of the energy storage devices 2. The pair of first side walls 12A and 12B are continuous with the long sides of the bottom wall 11. That is, the pair of first side walls 12A and 12B of the present embodiment are long side surfaces of the outer case body 10. The outer case body 10 of the present embodiment includes an extension portion 14A extending from the inner surface of the first side wall 12A toward the first side wall 12B, and an extension portion 14B extending from the inner surface of the first side wall 12B toward the first side wall 12A.

The extension portion 14A of the present embodiment is composed of a plurality of ribs 15 formed integrally with the first side wall 12A of the outer case body 10. Similarly, the extension portion 14B of the present embodiment is composed of a plurality of ribs 15 that are formed integrally with the first side wall 12B of the outer case body 10.

Each rib 15 is a rib for reinforcing the outer case body 10. The ribs 15 respectively project in the Y direction from the inner surfaces of the pair of first side walls 12A and 12B, and extend in the Z direction. The ribs 15 are arranged at predetermined intervals from each other in the X direction.

The extension portion 14A of the first side wall 12A is provided with a first fixing portion 16A, and the extension portion 14B of the second side wall 13B is provided with a first fixing portion 16B. The pair of first fixing portions 16A and 16B are arranged at a predetermined distance L1 from each other in the Y direction. The first fixing portion 16A of the present embodiment is composed of a plurality of pins projecting from the ribs 15 provided on the first side wall 12A to one side in the Z direction. Specifically, the first fixing portion 16A includes two first pins 17 provided in a central portion A1 of the first side wall 12A, and two second pins 18 provided in side portions A2 of the first side wall 12A in the X direction. Similarly, the first fixing portion 16B is composed of a plurality of pins projecting from the ribs 15 provided on the first side wall 12B to one side in the Z direction. The first fixing portion 16B includes two first pins 17 provided in the central portion A1 of the first side wall 12B, and two second pins 18 provided in the side portions A2 of the first side wall 12B in the X direction. The central portion A1 of the pair of first side walls 12A and 12B is a region that is located at the center of three regions when the pair of first side walls 12A and 12B are equally divided into the three regions in a direction (X direction in the present embodiment) in which each of the pair of first side walls 12A and 12B extends in a cross section orthogonal to the Z direction. The side portions A2 of the pair of first side walls 12A and 12B are regions that are located beside the central portion A1 in a direction (X direction in the present embodiment) in which each of the pair of first side walls 12A and 12B extends in a cross section orthogonal to the Z direction.

The pair of second side walls 13A and 13B of the present embodiment have a substantially rectangular shape, and are disposed on a plane (YZ plane) perpendicular to the X direction. The pair of second side walls 13A and 13B are continuous with the short sides of the bottom wall 11. That is, the pair of second side walls 13A and 13B of the present embodiment are the short side surfaces of the outer case body 10.

Figure 4:
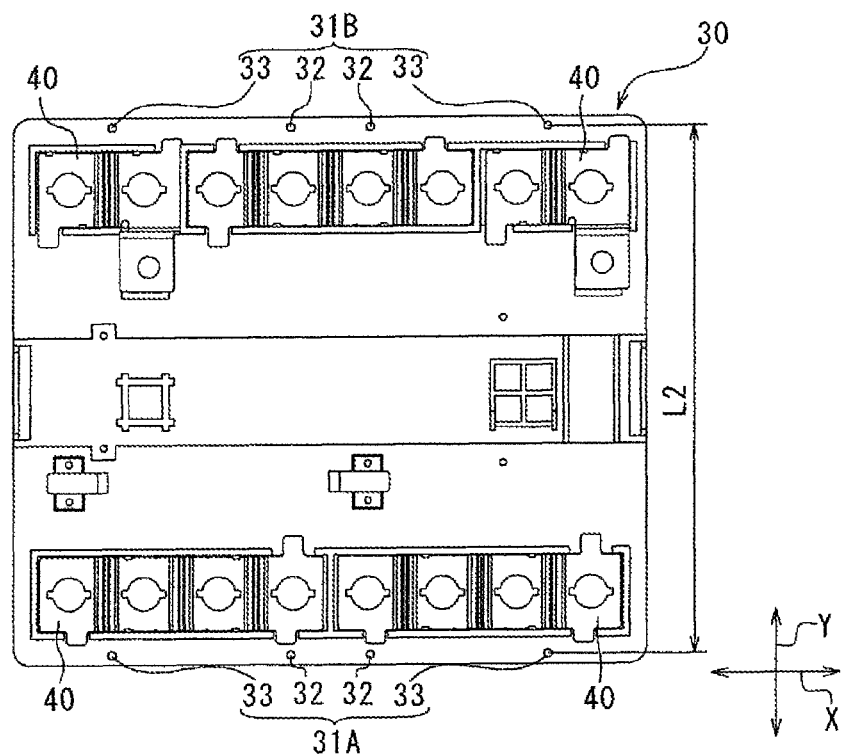
FIG. 4 is a plan view of an inner lid according to the first embodiment.

With reference to FIGS. 2 and 4, the inner lid 30 has a substantially plate shape and a substantially rectangular shape with an outer shape of a similar figure smaller than the inner shape of the outer case body 10, and is bonded to an end on one side of the energy storage device 2 in the Z direction. The inner lid 30 of the present embodiment includes a second fixing portion 31A mechanically connected to a first fixing portion 16A provided on the first side wall 12A of the outer case body 10, and a second fixing portion 31B mechanically connected with a first fixing portion 16B provided on the first side wall 12B of the outer case body 10. The pair of second fixing portions 31A and 31B are arranged at a predetermined distance L2 from each other in the Y direction. As with the outer case 3, the inner lid 30 may be formed of an insulating material such as PC, PP, PE, PS, PPS, PPE (including modified PPE), polyamide resin, PET, PBT, PEEK, PFA, PTFE, PES, ABS resin, or a composite material thereof.

The second fixing portion 31A of the present embodiment is composed of a plurality of insertion holes through which the plurality of pins 17 and 18 provided on the first side wall 12A can be inserted. Specifically, the second fixing portion 31A includes two first insertion holes 32 through which two first pins 17 of the first side wall 12A can be inserted, and two second insertion holes 33 through which two second pins 18 of the first side wall 12A can be inserted. Similarly, the second fixing portion 31B of the present embodiment is composed of a plurality of insertion holes through which the plurality of pins 17 and 18 provided on the first side wall 12B can be inserted. Specifically, the second fixing portion 31B includes two first insertion holes 32 through which two first pins 17 of the first side wall 12B can be inserted, and two second insertion holes 33 through which the second pins 18 of the first side wall 12B can be inserted.

The bus bar 40 is a plate-shaped member made of a conductive material such as metal including copper, copper alloy, aluminum, aluminum alloy, and the like. Each bus bar 40 electrically connects positive electrode terminals 2a of the energy storage devices 2 adjacent to each other in the X direction with each other, negative electrode terminals 2b with each other, or a positive electrode terminal 2a and a negative electrode terminal 2b with each other. The bus bars 40 are welded and joined to the positive electrode terminals 2a or the negative electrode terminals 2b of the energy storage devices 2.

Figure 5:
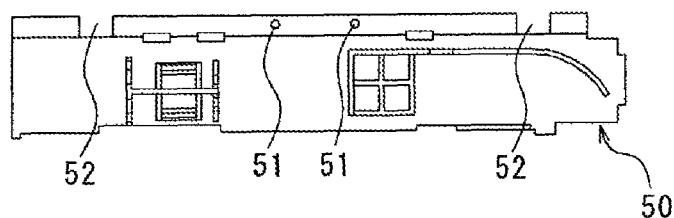
FIG. 5 is a plan view of a bus bar cover according to the first embodiment.
Figure 5:
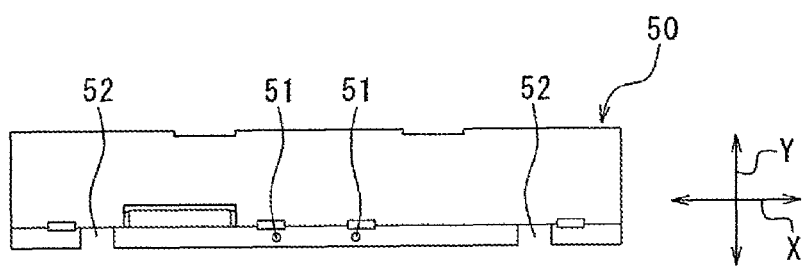

With reference to FIGS. 2 and 5, the bus bar cover 50 of the present embodiment includes two third insertion holes 51 through which two first pins 17 can be inserted, and two notches 52 provided at positions corresponding to two second pins 18.

Figure 6:
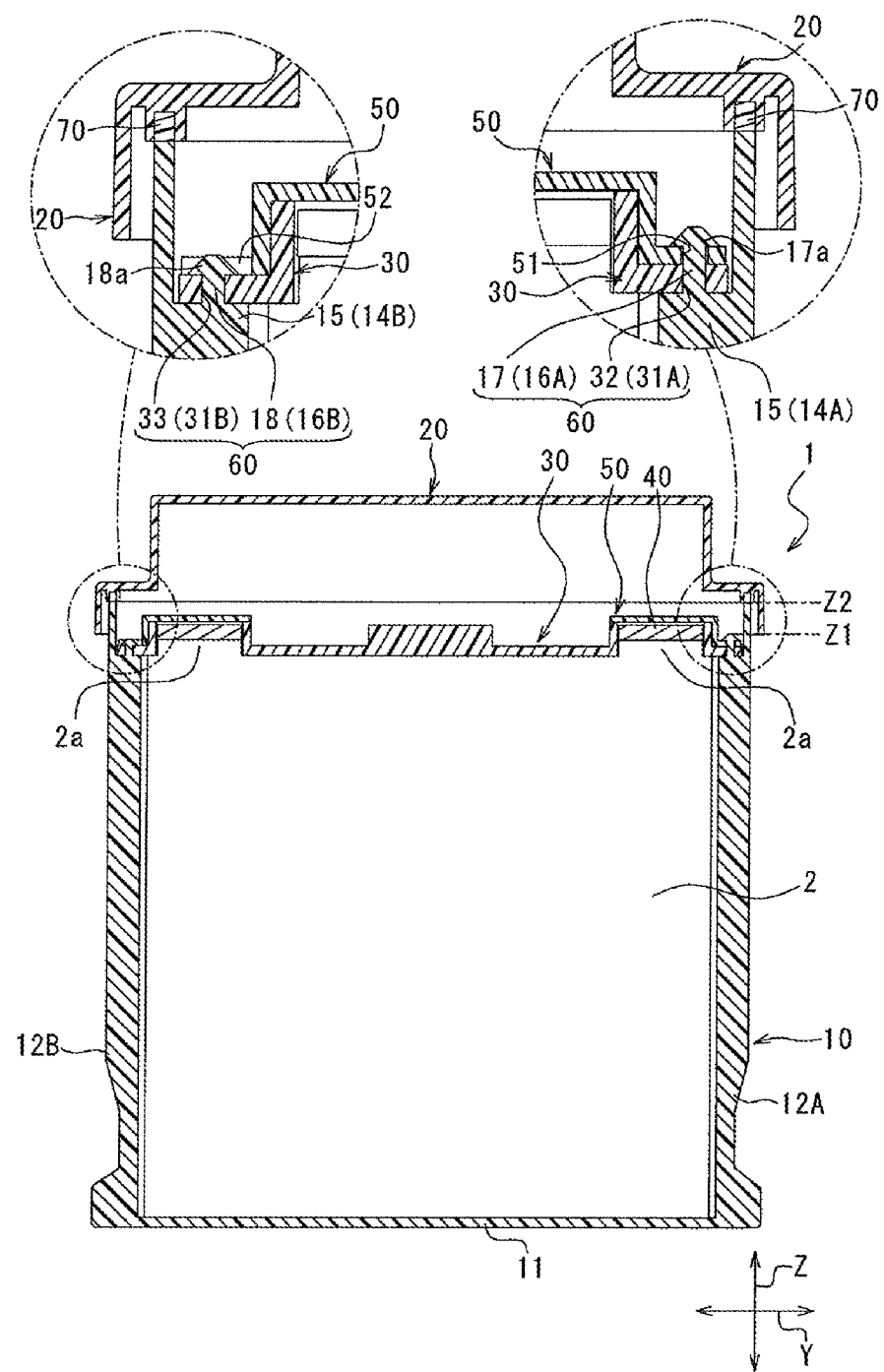
FIG. 6 is a sectional view of the energy storage apparatus according to the first embodiment taken along line VI-VI in FIG. 3.

With reference to FIG. 6, the first fixing portion 16A and the second fixing portion 31A are mechanically connected with each other, and the first fixing portion 16B and the second fixing portion 31B are connected with each other, so that the inner lid 30 and the bus bar cover 50 are fixed to the outer case body 10. Each first pin 17 includes an umbrella-shaped head 17a at an end on one side (upper side in FIG. 6) in the Z direction, and the inner lid 30 and the bus bar cover 50 are sandwiched between an end surface of the head 17a of the first pin 17 on the other side in the Z direction, and an end surface of a rib 15 on the one side in the Z direction.

Similarly, each second pin 18 includes an umbrella-shaped head 18a at an end on one side in the Z direction, and the inner lid 30 is sandwiched between an end surface of the head 18a of the second pin 18 on the other side in the Z direction, and an end surface of a rib 15 on the one side in the Z direction. Each notch 52 of the bus bar cover 50 is configured so that a head 18a of a second pin 18 and the bus bar cover 50 do not interfere with each other.

In other words, the first fixing portion 16A provided on the outer case body 10 and the second fixing portion 31A provided on the inner lid 30, and the first fixing portion 16B provided on the outer case body 10 and the second fixing portion 31B provided on the inner lid 30 form a fixing portion 60 of the outer case body 10 and the inner lid 30.

As described above, a peripheral edge of the opening of the outer case body 10, and a peripheral edge of the lid 20 are heat-welded. Specifically, the energy storage apparatus 1 of the present embodiment includes a joint portion 70 in which the outer case body 10 and the lid 20 are heat-welded in the cross section illustrated in FIG. 6. In the Z direction, the position of the fixing portion 60 on the lid 20 side (position of an end portion of the head 17a of the first pin 17 on the one side in the Z direction in the present embodiment) Z1 is located closer to the energy storage device 2 than the position of the joint portion 70 on the energy storage device 2 side (position of an end portion of the joint portion 70 on the other side in the Z direction in this embodiment) Z2.

[Manufacturing Process]

The following description will explain a method of manufacturing the energy storage apparatus 1 according to the present embodiment.

First, the energy storage device 2 is disposed inside the outer case body 10. Next, the inner lid 30 having an adhesive applied to a surface to be put into contact with the energy storage device 2 is prepared, and the first pins 17 and the second pins 18 provided on the outer case body 10 are respectively disposed through the first insertion holes 32 and the second insertion holes 33 of the inner lid 30.

In this state, an end portion of each second pin 18 on the one side in the Z direction is heated and pressed to form a head 18a of a second pin 18 and fix the inner lid 30 to the outer case body 10. Generally, this construction method is called "heat caulking", and, in the present invention, the same construction method is used not only to form the heads 18a of the second pins 18 but also to form the heads 17a of the first pins 17 to be described later. The fixing method of the present invention is not limited only to heat caulking, and, for example, a heat welding method of melting and joining both the heads 18a of the second pins 18 and the inner lid 30 that are to be joined can be also used. The head 18a of each second pin 18 can be irradiated with a laser to form the head 18a like heat caulking, or a portion of the head 18a of each second pin 18 and a portion of the inner lid 30 which are in contact with each other can be melted and integrated.

Then, the bus bar 40 is disposed on the positive electrode terminal 2a or the negative electrode terminal 2b of the energy storage device 2, and the bus bar 40 is welded to the positive electrode terminal 2a or the negative electrode terminal 2b of the energy storage device 2.

Furthermore, the bus bar cover 50 is disposed so as to cover the bus bar 40 from one side in the Z direction by passing the first pins 17 provided on the outer case body 10 through the third insertion holes 51 provided at the bus bar cover 50. In this state, an end portion of each first pin 17 on the one side in the Z direction is heated and pressed to form the head 17a of the first pin 17, and the inner lid 30 and the bus bar cover 50 are fixed to the outer case body 10.

Figure 7:
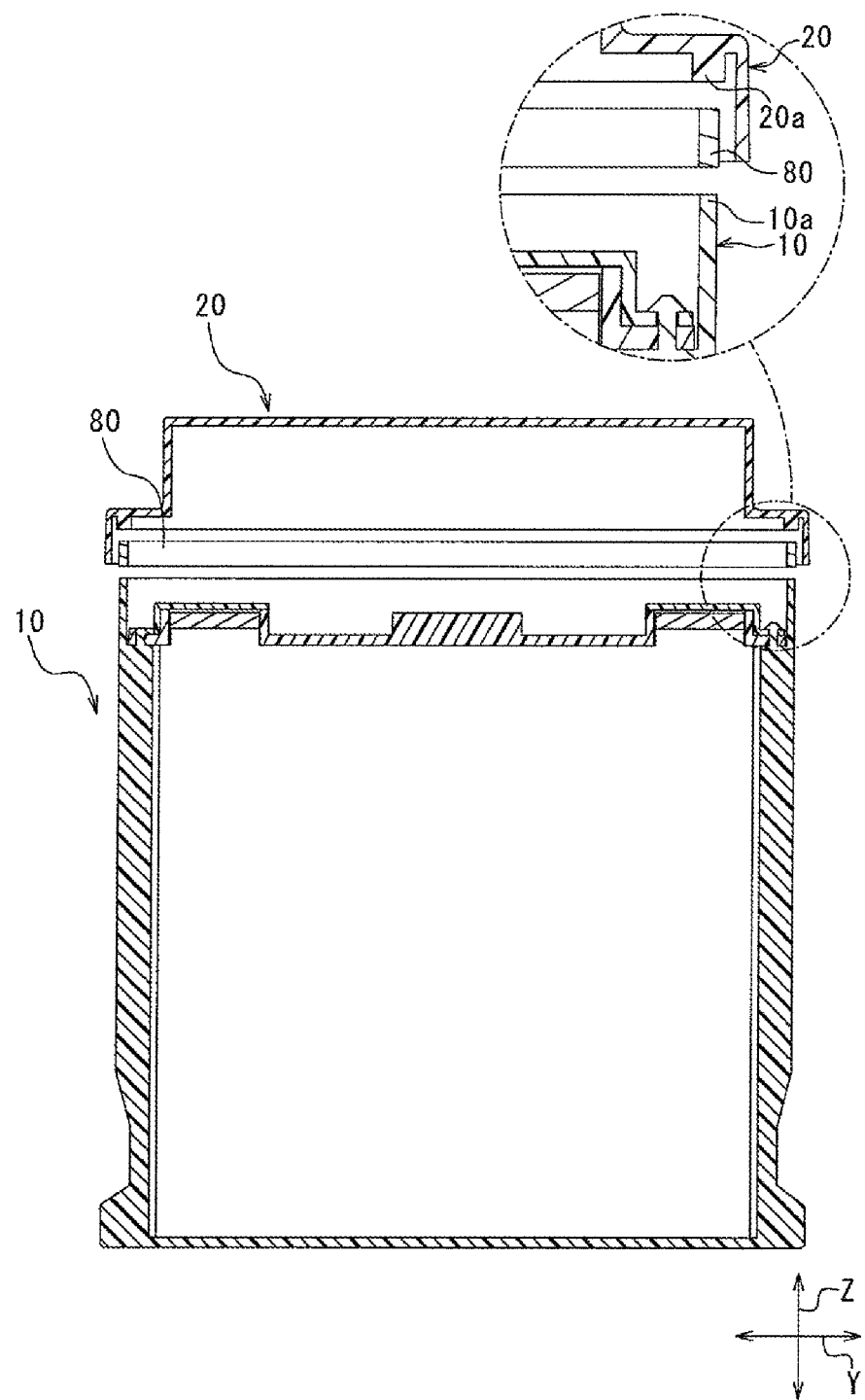
FIG. 7 is a view similar to FIG. 6 illustrating a state in which the outer case body and the lid of the energy storage apparatus according to the first embodiment are heat-welded.

Finally, as illustrated in FIG. 7, an attachment portion 20a of the lid 20 on the other side in the Z direction, and an end portion 10a of the outer case body 10 on the one side in the Z direction are heat-welded using a hot plate 80. An attachment portion 20a of the lid 20, and an end portion 10a of the outer case body 10 are melted using a hot plate 80, and the melted parts are held in a state of being abutted with each other and cooled while being pressed, so that the lid 20 and the outer case body 10 are fixed to each other.

According to this configuration, since the first fixing portion 16A and the second fixing portion 31A are connected with each other and the first fixing portion 16B and the second fixing portion 31B are connected with each other, a distance L1 between the pair of first fixing portions 16A and 16B is defined by a predetermined distance L2 between the pair of second fixing portions 31A and 31B. Therefore, even if the pair of first side walls 12A and 12B are deformed during injection molding, it is possible to prevent or suppress deformation of the pair of first side walls 12A and 12B of the outer case body 10 by appropriately maintaining the distance between the pair of first side walls 12A and 12B. Since the inner lid 30 is disposed on one side of an end of the energy storage device 2 on the one side, the volume of the space for accommodating the energy storage devices 2 in the outer case body 10 can be ensured, and the volume energy density of the energy storage device 2 can be ensured.

Since the long side surface is more likely to be deformed during injection molding than the short side surface, the distance between the pair of first side walls 12A and 12B, which are the long side surfaces, is appropriately maintained by the pair of first fixing portions 16A and 16B, and the pair of second fixing portions 31A and 31B. Accordingly, deformation of the pair of first side walls 12A and 12B of the outer case body 10 can be effectively prevented or suppressed.

The central portion A1 of the first side wall 12A is more likely to be deformed during injection molding than the side portions A2 where the first side wall 12A is connected with the pair of second side walls 13A and 13B. Similarly, the central portion A1 of the first side wall 12B is more likely to be deformed during injection molding than the side portions A2 where the first side wall 12B is connected with the pair of second side walls 13A and 13B. Therefore, it is possible to effectively prevent or suppress deformation of the pair of first side walls 12A and 12B of the outer case body 10 by appropriately maintaining the distance between the central portions A1 of the pair of first side walls 12A and 12B by the pair of first fixing portions 16A and 16B, and the pair of second fixing portions 31A and 31B.

Since the extension portion 14A of the energy storage apparatus 1 is constituted of the reinforcing ribs 15, and the extension portion 14B is constituted of the reinforcing ribs 15, it is unnecessary to provide the reinforcing ribs separately from the pair of extension portions 14A and 14B, and space saving can be realized.

In the Z direction, the position on the lid 20 side of the fixing portion 60 of the inner lid 30 and the outer case body 10 is located closer to the energy storage device 2 than the joint portion 70 in which the outer case body 10 and the lid 20 are heat-welded. Therefore, it is possible to prevent the hot plate 80 used for heat-welding the outer case body 10 and the lid 20 from interfering with the fixing portion 60.

Since the inner lid 30 is bonded to the energy storage devices 2, warp deformation of the inner lid 30 can be suppressed, and thus the distance L2 between the pair of second fixing portions 31A and 31B can be appropriately maintained, and deformation of the pair of first side walls 12A and 12B of the outer case body 10 can be effectively prevented or suppressed.

Although the present invention has been described above with reference to the suitable first embodiment, the present invention is not limited to a specific embodiment, and various changes can be made within the scope of the gist of the present invention described in the claims.

For example, the bus bar cover 50 does not have to be fixed to the outer case body 10.

The pair of first fixing portions 16A and 16B may be insertion holes, and the pair of second fixing portions 31A and 31B may be pins.

Both the pair of first fixing portions 16A and 16B, and the pair of second fixing portions 31A and 31B may be insertion holes, or pins separate from these may be prepared.

Furthermore, the pair of second side walls 13A and 13B may include a pair of first fixing portions such as a plurality of pins.

Although the first side walls 12A and 12B are specified to be the long side surfaces of the outer case body 10 in the first embodiment described above, embodiments of the present invention are not limited to this and include a case where the first side walls 12A and 12B are the short side surfaces of the outer case body 10. For example, which surfaces the long side surfaces and the short side surfaces of the outer case body 10 become can be changed depending on a direction in which the energy storage devices 2 are arranged. Specifically, when eight energy storage devices 2 are arranged in the Y direction unlike the first embodiment described above, the first side walls 12A and 12B disposed in the XZ plane become the short side surfaces of the outer case body 10, and the second side walls 13A and 13B disposed on the YZ plane become the long side surfaces of the outer case body 10.

As described above, when the array direction of the energy storage devices 2 is the Y direction, the pair of first side walls 12A and 12B are walls extending in a direction orthogonal to the array direction of the energy storage devices 2 and become the short side surfaces of the outer case body 10. That is, the pair of first fixing portions 16A and 16B provided on the pair of first side walls 12A and 12B are disposed on one side and the other side of the outer case body 10 in the Y direction (array direction of the energy storage devices 2).

The case of the energy storage devices 2 may expand over time, and the outer case body 10 of the energy storage apparatus 1 may be deformed under the influence thereof. In particular, in a case where the electric storage devices 2 have a prismatic shape as in the first embodiment described above, the Y direction in which the electric storage devices 2 are arranged (stacked) coincides with a direction in which the energy storage devices 2 are likely to expand. Therefore, the pair of first side walls 12A and 12B, which are walls extending in a direction orthogonal to the array direction of the energy storage devices 2, may be most affected under the influence and deform outward in the Y direction. In this aspect, as described above, the pair of first fixing portions 16A and 16B fixed to the inner lid 30 are provided on the pair of first side walls 12A and 12B, and are disposed on one side and the other side of the outer case body 10 in the Y direction (array direction of the energy storage device 2). As a result, the force of the plurality of energy storage devices 2 attempting to deform outward in the Y direction is consumed as a force for pulling the inner lid 30 outward in the Y direction, and thus it is possible to suppress deformation of the pair of first side walls 12A and 12B outward in the Y direction.

In the aspect described above, the short side surfaces and the long side surfaces of the outer case body 10 have been described by taking a direction in which the energy storage devices 2 are arranged as an example. However, the short side surfaces and the long side surfaces of the outer case body 10 may be interchanged by changing the number of the energy storage devices 2 to be arranged, or changing the case size of the energy storage devices 2. Also in this case, by providing the pair of first fixing portions 16A and 16B for attaching the inner lid 30 to the pair of first side walls 12A and 12B, the effects described above are exhibited in each of a case where the pair of first side walls 12A and 12B become the long side surfaces and a case where the pair of first side walls 12A and 12B become the short side surfaces.

Further speaking, in a case where the area of the long side surface of the case of one energy storage device 2 is equal to the total area of the short side surfaces of the cases of the plurality of energy storage devices gathered together, the area of the first side walls 12A and 12B and the area of the second side walls 13A and 13B become equal. In this case, although the concept of a short side surface and a long side surface is eliminated, the effect of suppressing deformation of the outer case body, which is the effect of the present invention, is exhibited without a change.

Second Embodiment

Next, the second embodiment will be described in detail, focusing on a coupling structure of an outer case body and an inner lid in an outer case.

Conventionally, an energy storage apparatus including an energy storage device and an outer case is known. For example, Patent Document 2 discloses a power supply device provided with a storage case that accommodates a power supply device body including an assembled battery having a plurality of battery cells aligned. Specifically, the storage case has a case body that accommodates the power supply device body, and a lid that closes an opening of the case body. The lid and the case body are fastened by screws respectively inserted into through holes provided at four corners of the lid. That is, the lid is coupled to the case body by the plurality of screws.

Like the storage case in the conventional power supply device, it is possible to firmly couple the inner lid and the outer case body in the outer case having a structure in which the outer case body and the member (inner lid) disposed in the opening of the outer case body are coupled using a plurality of screws (bolts). However, since the bolts and nuts are generally made of metal, when the number of bolts is increased in order to more firmly couple the inner lid and the outer case body, for example, problems such as an increase in the number of parts or an increase in the weight of the energy storage apparatus may occur. Since the work of turning the bolts (or nuts) is sequentially performed for each of the plurality of bolts, more firmly coupling the inner lid and the outer case body may lead to lowering of the manufacturing efficiency of the energy storage apparatus.

The present invention has been made by the inventor of the present application by newly focusing on the above problems, and it is a second object to provide an energy storage apparatus having an energy storage device and an outer case, which has a simple configuration and high reliability.

An energy storage apparatus according to an aspect of the present invention is an energy storage apparatus including an energy storage device and an outer case, in which the outer case has an outer case body that accommodates the energy storage device, and an inner lid that is disposed above the energy storage device, one of the outer case body and the inner lid has a pin, the other has a hole, and a tip portion of the pin is heat-caulked with the pin penetrating the hole.

According to this structure, the tip portion of the pin inserted into the hole is heat-caulked, and accordingly the outer case body and the inner lid are coupled to each other. Therefore, for example, the outer case body and the inner lid are firmly coupled to each other while the work for the coupling is facilitated as compared with a case where the outer case body and the inner lid are coupled using bolts. For example, even when the outer case is provided with a plurality of combinations of pins and holes, it is possible to heat-caulk the plurality of pins simultaneously or substantially simultaneously. Therefore, it is possible to improve the coupling force between the outer case body and the inner lid, and to efficiently manufacture an energy storage apparatus. As described above, the energy storage apparatus of this aspect is an energy storage apparatus with a simple configuration and high reliability.

The hole may be formed at a peripheral edge of the inner lid, and the pin may be formed at a position of the outer case body facing the peripheral edge of the inner lid so as to project toward the inner lid.

According to this configuration, the tip of the pin can be heat-caulked from above with the pin of the outer case body penetrating the hole of the inner lid. That is, the work of heat caulking can be easily performed. Accordingly, for example, the accuracy of the work is improved, and as a result, the reliability of the energy storage apparatus is improved.

The outer case body may be erected on an inner surface located beside the energy storage device and have a rib extending in an alignment direction of the inner lid and the outer case body, and the pin may be erected on an end portion of the rib on the inner lid side.

According to this configuration, the rib improves the strength of the outer case body, and the rib forms a structure that supports at least a part of the inner lid. Therefore, the inner lid is more stably supported by the outer case body. This contributes to improvement of the reliability of the energy storage apparatus.

A plurality of the pins may be provided on one of the outer case body and the inner lid, and the plurality of pins may be disposed at positions that do not have rotational symmetry with respect to the center of one of the outer case body and the inner lid when viewing the one in plan.

According to this configuration, the plurality of holes provided at the other of the outer case body and the inner lid are also disposed at positions that do not have rotational symmetry with respect to the center of the other. Accordingly, the one-to-one relationship between the plurality of pins and the plurality of holes is uniquely determined, so that it is easy to determine the orientation (posture) of the inner lid with respect to the outer case body when the inner lid is disposed on the outer case body. That is, in a case where the shape of the inner lid in plan view is a rotationally symmetric shape such as a regular polygon, the possibility that the inner lid is disposed (misplacement) in an erroneous orientation (posture) on the outer case body is reduced. Therefore, an event such as lowering of the manufacturing efficiency due to misplacement or damage to a member due to misplacement, which may cause lowering of the reliability of the energy storage apparatus, is unlikely to occur.

A plurality of the pins are provided on one of the outer case body and the inner lid, and the shape in plan view, the size, or the posture of one of the plurality of pins may be different from the shape in plan view, the size, or the posture of one or more other pins.

With this configuration where a combination of one of the plurality of pins and one of the plurality of holes is uniquely determined, it is easy to determine the orientation (posture) of the inner lid with respect to the outer case body when the inner lid is disposed on the outer case body. That is, in a case where the shape of the inner lid in plan view is a rotationally symmetric shape such as a regular polygon, the possibility that the inner lid is disposed (misplacement) in an erroneous orientation (posture) on the outer case body is reduced. Therefore, an event such as lowering of the manufacturing efficiency due to misplacement or damage to a member due to misplacement, which may cause lowering of the reliability of the energy storage apparatus, is unlikely to occur.

The inner lid may have a substantially rectangular shape in plan view, and one of the outer case body and the inner lid may be provided with N (N is a positive odd number) pins.

For example, assume that the shape of the inner lid in plan view is a shape that is recognized as a rectangle as a whole, and that three holes into which the pins of the outer case body are inserted are disposed at the peripheral edge of the inner lid. In this case, the inner lid has rotational symmetry at every 180°, while it is impossible to dispose the three pins on the outer case body so as to have rotational symmetry at every 180°. That is, the arrangement positions of the three pins at the outer case body are positions that do not have rotational symmetry at every 180°, and accordingly misplacement of the inner lid with respect to the outer case body does not occur.

With the present invention, it is possible to provide an energy storage apparatus with a simple configuration and high reliability.

The following description will explain an energy storage apparatus according to a second embodiment of the present invention and a modification example thereof with reference to the drawings.

In the following description, for example, a plus side in the X direction indicates a side of the X axis represented by the arrow direction, and a minus side in the X direction indicates a side opposite to the plus side in the X direction. The same applies to the Y direction and the Z direction.

[General description of energy storage apparatus 1a]

The basic structure of an energy storage apparatus 1a according to the present embodiment is common to the basic structure of the energy storage apparatus 1 according to the first embodiment. Hereinafter, in the description of the energy storage apparatus 1a, description of items common to the energy storage apparatus 1 according to the first embodiment may be omitted. Since there is no significant difference in appearance between the energy storage apparatus 1a and the energy storage apparatus 1, an external perspective view of the energy storage apparatus 1a is omitted.

Figure 8:
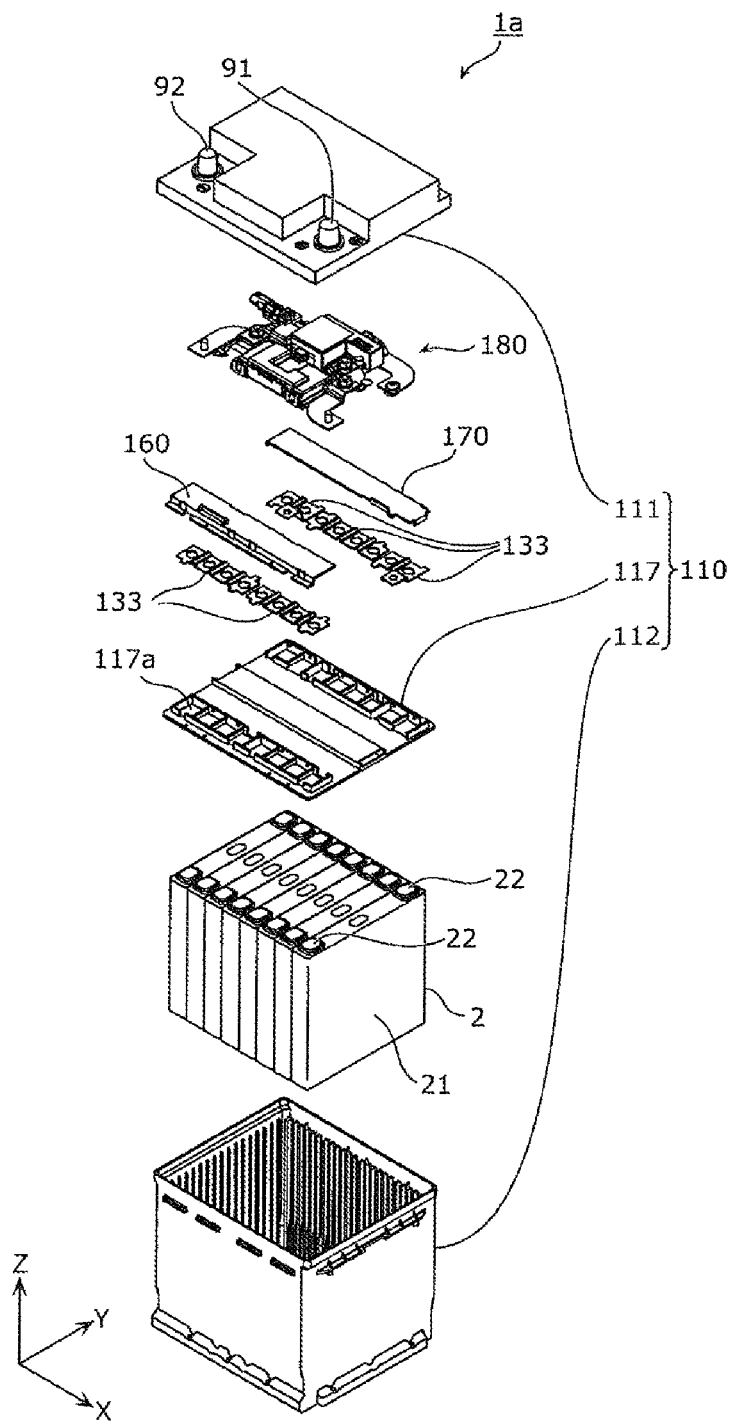
FIG. 8 is an exploded perspective view illustrating each component of a case where the energy storage apparatus according to a second embodiment is disassembled.

A general description of the energy storage apparatus 1a according to the second embodiment will be given with reference to FIG. 8. FIG. 8 is an exploded perspective view illustrating each component of a case where the energy storage apparatus 1a according to the second embodiment is disassembled.

As illustrated in FIG. 8, the energy storage apparatus 1a includes an energy storage device 2, and an outer case 110 that accommodates the energy storage device 2. In the present embodiment, the outer case 110 accommodates eight energy storage devices 2. The outer case 110 has an outer case body 112 that accommodates the plurality of energy storage devices 2, and an inner lid 117 that is disposed above the plurality of energy storage devices 2. In the present embodiment, the outer case 110 further has a lid 111 disposed so as to cover an upper side of the inner lid 117. Inside the outer case 110, a plurality of bus bars 133 held on the inner lid 117, bus bar covers 160 and 170, and a connection unit 180 including a control circuit or the like are accommodated in addition to the plurality of energy storage devices 2.

The outer case 110 is a rectangular (box-shaped) case (module case) that constitutes an outer case of the energy storage apparatus 1a. That is, the outer case 110 is a member that fixes the plurality of energy storage devices 2, the inner lid 117, and the like at predetermined positions and protects these elements from an impact or the like.

The lid 111 of the outer case 110 is a rectangular member that closes the opening of the outer case body 112 and has an external terminal 91 on the positive electrode side and an external terminal 92 on the negative electrode side. The external terminals 91 and 92 are electrically connected with the plurality of energy storage devices 2 via the connection unit 180 and bus bars 133, and the energy storage apparatus 1a charges electricity from the outside or discharges electricity to the outside via the external terminals 91 and 92. The external terminals 91 and 92 are formed of, for example, a conductive member made of metal such as aluminum or aluminum alloy. The outer case body 112 is a bottomed rectangular tubular housing (cabinet) provided with an opening and accommodates the energy storage devices 2 and the like.

Each energy storage device 2 has a flat rectangular parallelepiped shape (prismatic shape), and eight energy storage devices 2 are arranged in the X direction in the present embodiment.

Specifically, each energy storage device 2 includes a case 21 made of metal, and electrode terminals 22 (positive electrode terminal and negative electrode terminal) made of metal are provided on a lid part of the case 21. The electrode terminals 22 (positive electrode terminal and negative electrode terminal) are each an electrode terminal that is disposed so as to project from the lid part of the case 21 toward the inner lid 117 (upward, that is, toward the plus side in the Z direction). The electrode terminals 22 are connected with the external terminals 91 and 92 via at least one bus bar 133 and the connection unit 180, so that the energy storage apparatus 1a can charge electricity from the outside or discharge electricity to the outside. The lid part of the case 21 may be provided with an electrolyte solution filling part or the like for electrolyte solution filling. Inside the case 21, an electrode assembly (also referred to as an energy storage element or a power generating element), a current collector (positive electrode current collector and negative electrode current collector), and the like are disposed, and an electrolyte solution (nonaqueous electrolyte) or the like is enclosed, though detailed description is omitted.

Each bus bar 133 is a rectangular plate-shaped member that is disposed on at least two energy storage devices 2 in a state held by the inner lid 117 and is electrically connected with the electrode terminals 22 of the at least two energy storage devices 2. In the present embodiment, five bus bars 133 are used for each connecting two storage devices 2 in parallel to form four sets of energy storage device groups, and the four sets of energy storage device groups are connected in series.

The connection unit 180 is a unit having a plurality of bus bars, a control board, and the like, and connects the energy storage device groups including eight energy storage devices 2 with the external terminals 91 and 92. In the present embodiment, the connection unit 180 is fixed to the inner lid 117. The detection circuit and the control circuit may be formed on separate substrates. The connection unit 180 may not have a control board. In this case, for example, a control device disposed outside the energy storage apparatus 1a may control charging and discharging of each energy storage device 2.

The inner lid 117 is an example of an inner lid to be disposed above the plurality of energy storage devices 2 (on a side where the electrode terminals 22 are disposed), and is a member that holds the bus bars 133 in the present embodiment. More specifically, the inner lid 117 is a member that can hold the plurality of bus bars 133, the connection unit 180, other wirings (not shown), and the like, and can restrict the positions of these members or the like. The inner lid 117 is provided with a plurality of bus bar openings 117a that hold each of the plurality of bus bars 133 and expose a part of each of the plurality of bus bars 133 toward the plurality of energy storage devices 2. The inner lid 117 is fixed to the outer case body 112 by a method to be described later, and thus also has a role of restricting upward (plus side in the Z direction) movement of the plurality of energy storage devices 2, for example.

The inner lid 117 disposed above the plurality of energy storage devices 2 may be called, for example, a "bus bar frame".

Each of the bus bar covers 160 and 170 is a member made of resin that covers the plurality of bus bars 133 from above, and has a role of electrically insulating the plurality of bus bars 133 and the connection unit 180 from each other, for example.

[Coupling structure of Bus Bar Plate and Outer Case Body]

In the energy storage apparatus 1a configured as described above, the inner lid 117 is coupled to the outer case body 112 of the outer case 110 by heat caulking. Hereinafter, the coupling structure of the inner lid 117 and the outer case body 112 according to the present embodiment will be described with reference to FIGS. 9 to 11.

Figure 9:
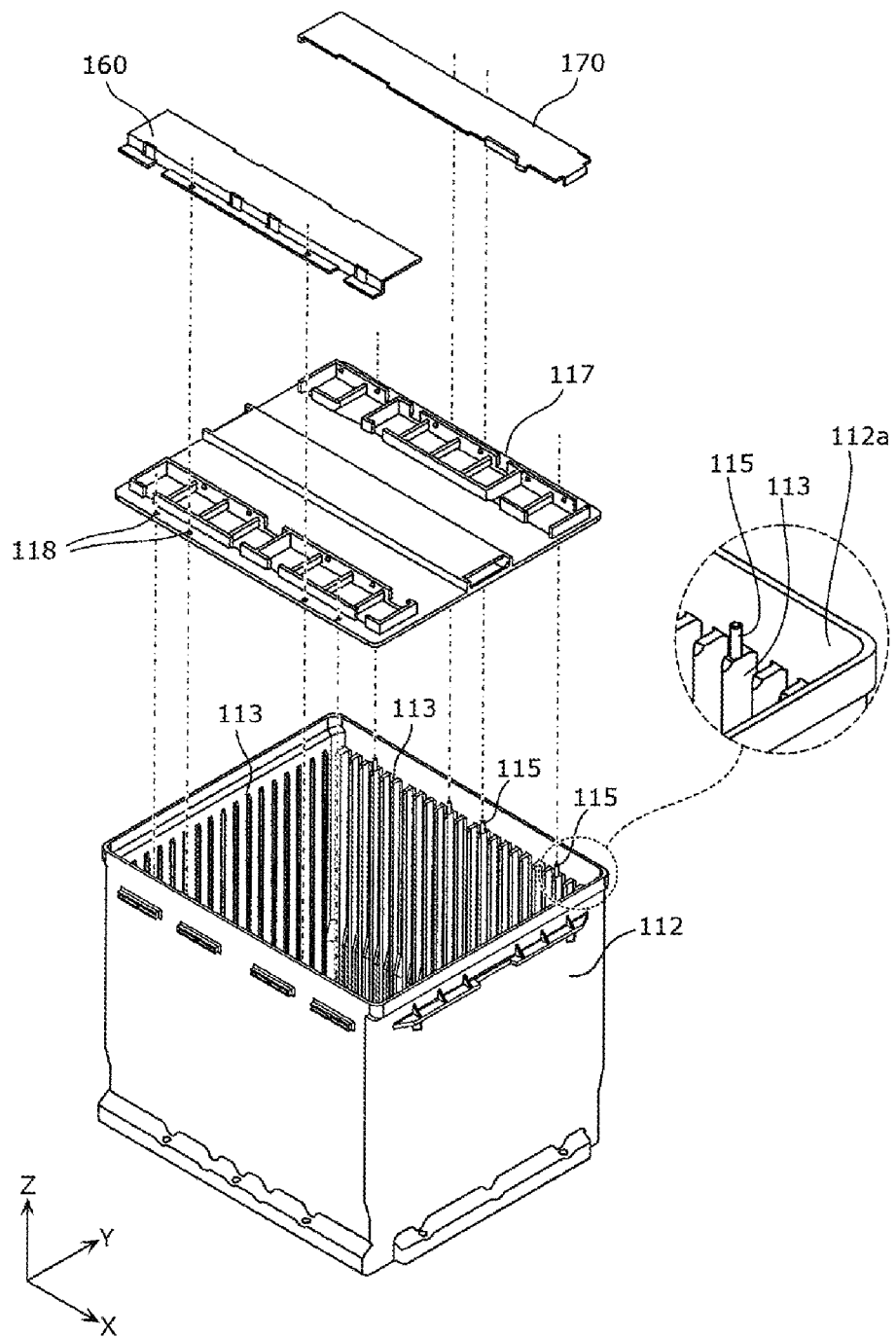
FIG. 9 is a perspective view illustrating the structural relationship between an outer case body, a bus bar plate, and a bus bar cover according to the second embodiment.
Figure 10A:
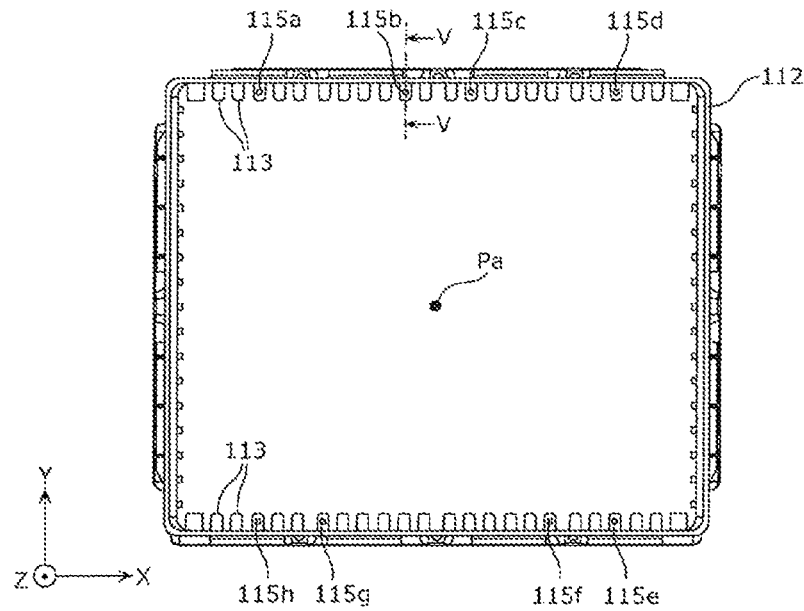
FIG. 10A is a plan view of the outer case body according to the second embodiment.
Figure 10B:
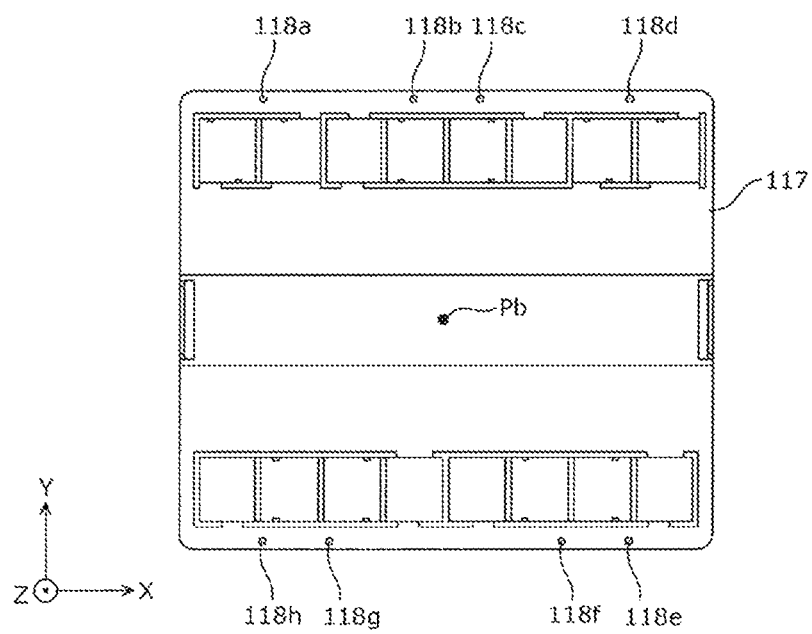
FIG. 10B is a plan view of the bus bar plate according to the second embodiment.
Figure 10C:
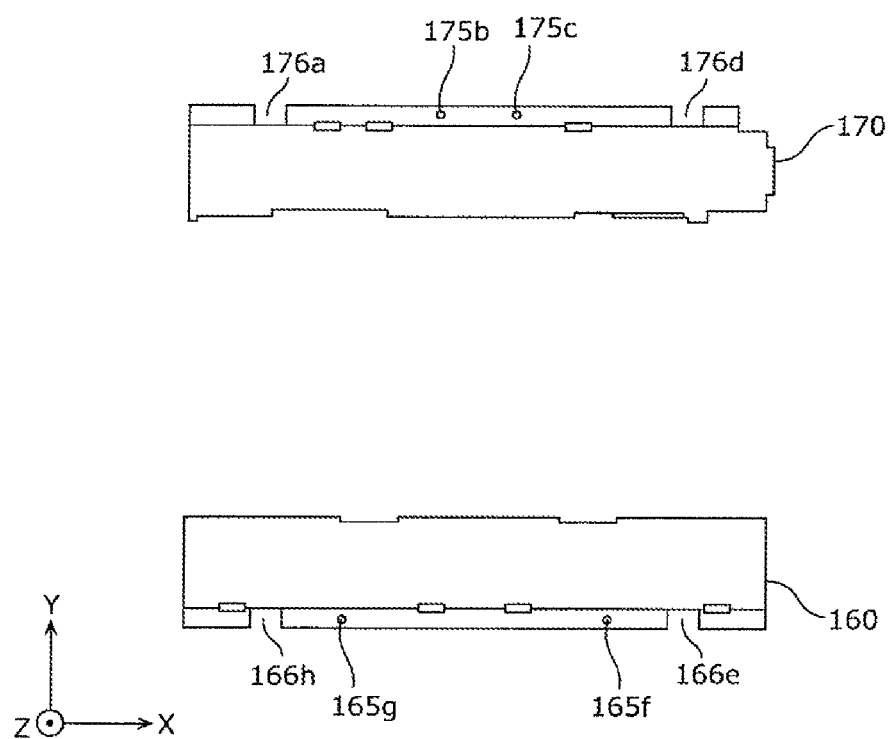
FIG. 10C is a plan view of the bus bar cover according to the second embodiment.
Figure 11:
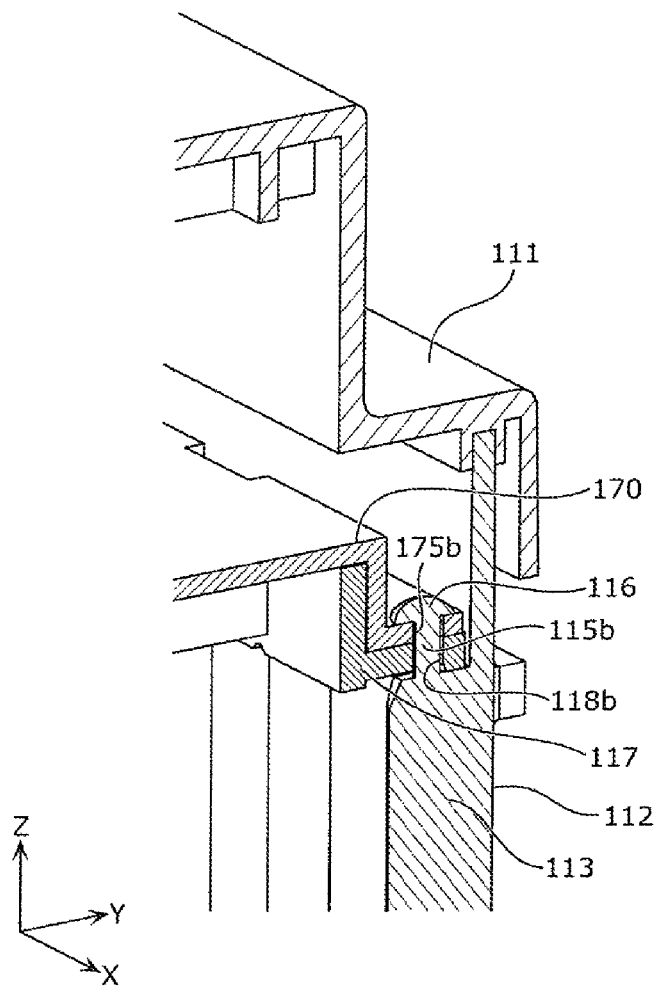
FIG. 11 is a cross-sectional perspective view illustrating a coupling portion of the outer case body and the bus bar plate according to the second embodiment.

FIG. 9 is a perspective view illustrating the structural relationship between the outer case body 112, the inner lid 117, and the bus bar covers 160 and 170 according to the second embodiment. FIG. 10A is a plan view of the outer case body 112 according to the second embodiment. FIG. 10B is a plan view of the inner lid 117 according to the second embodiment. FIG. 10C is a plan view of the bus bar covers 160 and 170 according to the second embodiment. FIG. 11 is a cross-sectional perspective view illustrating a coupling portion of the outer case body 112 and the inner lid 117 according to the second embodiment. FIG. 11 illustrates a perspective view of the energy storage apparatus 1a cut along the YZ plane passing through line V-V in FIG. 10A, and other elements such as the energy storage devices 2 are not shown.

In the present embodiment, the outer case body 112 of the outer case 110 is provided with a plurality of pins 115 as illustrated in FIGS. 9 and 10A. Specifically, eight pins 115 denoted by symbols 115a to 115h in FIG. 10A are provided on the outer case body 112. The pin 115 is an example of a pin provided at the pair of first fixing portions or the pair of second fixing portions. In the present embodiment, the pins 115a to 115d correspond to the first fixing portion 16A in the first embodiment, and the pins 115e to 115h correspond to the first fixing portion 16B in the first embodiment.

Each of these pins 115 is inserted into a hole 118 provided at the inner lid 117, and a tip portion of the pin 115 is heat-caulked. Specifically, in FIG. 10B, eight holes 118 denoted by symbols 118a to 118h are provided at the inner lid 117, and a pin 115 denoted by the same alphabet as one of the eight holes 118 is inserted into this hole. For example, the pin 115a is inserted into the hole 118a, and the pin 115b is inserted into the hole 118b. Furthermore, a tip portion of each pin 115 is heat-caulked with the pin 115 penetrating a hole 118. Each hole 118 is an example of an insertion hole provided at the pair of first fixing portions or the pair of second fixing portions. In the present embodiment, the holes 118a to 118d correspond to the second fixing portion 31A in the first embodiment, and the holes 118e to 118h correspond to the second fixing portion 31B in the first embodiment.

That is, a tip portion of each pin 115 is heated and melted, and then cooled and solidified, so that a head 116 is formed at the tip portion of the pin 115 (pin 115b in FIG. 11) as illustrated in FIG. 11. Here, the head 116 is a part integrally provided with the pin 115 and has a larger outer diameter than a part of the pin 115 between the base and the head 116. Since the head 116 is a part formed by melting and then solidifying, the head 116 is formed in a shape in close contact with the object to be coupled (bus bar cover 170 in FIG. 11). Alternatively, the head 116 is formed in a state of being fused together with the object to be coupled. Accordingly, the inner lid 117 is firmly coupled to the outer case body 112.

In the present embodiment, the bus bar cover 160 or 170 is fixed to the outer case body 112 together with the inner lid 117 at four of the eight heat-caulking portions on the outer case 110. Specifically, as illustrated in FIG. 10C, the bus bar cover 160 is provided with holes 165f and 165g, and the bus bar cover 170 is provided with holes 175b and 175c. Into each of these holes 165f, 165g, 175b, and 175c, a pin 115 penetrating the hole 118 of the inner lid 117 disposed at a corresponding position is inserted, and the tip portion of the pin 115 is heat-caulked in this state. In this way, the bus bar covers 160 and 170 are coupled to the outer case body 112 by heat caulking together with the inner lid 117, so that the manufacturing efficiency of the energy storage apparatus 1a can be improved, and the bus bar covers 160 and 170 can be firmly fixed to the outer case body 112.

At the bus bar cover 160, openings 166h and 166e are arranged on the same line with the holes 165g and 165f. Heads 116 of pins 115h and 115e that are heat-caulked without penetrating the bus bar cover 160 are disposed in these openings 166h and 166e. At the bus bar cover 170, openings 176a and 176d are arranged on the same line with the holes 175b and 175c. Heads 116 of pins 115a and 115d that are heat-caulked without penetrating the bus bar cover 170 are disposed in these openings 176a and 176d.

Here, in the present embodiment, the outer case body 112 has the pins 115, and the inner lid 117 has the holes 118 into which the pins 115 are inserted. However, the arrangement positions of the pins 115 and the holes 118 are not limited to this, and one of the outer case body 112 that accommodates an energy storage device 2, and the inner lid (inner lid 117 in the present embodiment) that is disposed above the energy storage device 2 may have the pins 115, while the other may have the holes 118. For example, a flange that spreads outward is provided on the periphery of the upper opening of the outer case body 112, and a hole 118 is formed at the flange. Apart facing the flange may be provided at the peripheral edge of the inner lid 117, and a pin 115 projecting downward may be provided at that part. Even in this case, the outer case body 112 that accommodates the energy storage device 2, and the inner lid 117 serving as an inner lid disposed above the energy storage device 2 can be firmly coupled by utilizing heat caulking.

As described above, the energy storage apparatus 1a according to the present embodiment is an energy storage apparatus 1a including the energy storage device 2 and the outer case 110, and the outer case 110 has the outer case body 112 that accommodates the energy storage device 2, and the inner lid 117 disposed above the energy storage device 2. One of the outer case body 112 and the inner lid 117 has a pin 115 while the other has a hole 118, and the tip portion of the pin 115 is heat-caulked with the pin 115 penetrating the hole.

According to this configuration, the tip portion of the pin 115 inserted into the hole 118 is heat-caulked, and accordingly the outer case body 112 and the inner lid 117 are coupled to each other. Therefore, for example, the outer case body 112 and the inner lid 117 can be firmly coupled. The work for coupling is facilitated in comparison with a case where the outer case body 112 and the inner lid 117 are coupled using bolts. For example, even when the outer case 110 is provided with a plurality of combinations of the pins 115 and the holes 118 as in the present embodiment, a plurality of pins 115 can be heat-caulked simultaneously or substantially simultaneously by using a device for performing heat caulking. Therefore, it is possible to improve the coupling force between the outer case body 112 and the inner lid 117, and to efficiently manufacture the energy storage apparatus 1a. As described above, the energy storage apparatus 1a according to the present embodiment is an energy storage apparatus 1a with a simple configuration and high reliability If a bolt is used to couple the outer case body 112 and the inner lid 117, it is necessary to provide a hole at one of the outer case body 112 and the inner lid 117, and to embed a bolt head or a nut in the other. Consequently, a region for embedding the head of a screw or a nut is essential in the other side, when viewed from the axial direction of the bolt. This may waste the space inside the outer case 110, for example. In this regard, the energy storage apparatus 1a according to the present embodiment may be provided with a convex pin 115 at one of the outer case body 112 and the inner lid 117 toward the other side. Therefore, it is unnecessary to provide an extra region at the base part of the pin 115. For example, even if the energy storage apparatus 1a is subjected to an excessive impact and the pin 115 made of resin is scattered, the scattered pin 115 is unlikely to damage other members.

The heat caulking is advantageous in that, for example, a waiting time for curing adhesive is not required in comparison with a case where an adhesive is used instead of heat caulking for coupling the outer case body 112 and the inner lid 117.

More specifically, in the energy storage apparatus 1a according to the present embodiment, the holes 118 are formed at the peripheral edge of the inner lid 117 as illustrated in FIG. 10B, for example. As illustrated in FIG. 10A, for example, the pins 115 are formed at positions of the outer case body 112 facing the peripheral edge of the inner lid 117 so as to project toward the inner lid 117.

According to this configuration, the tip of each pin 115 can be heat-caulked from above with the pin 115 of the outer case body 112 penetrating a hole 118 of the inner lid 117. That is, the work of heat caulking can be easily performed. Accordingly, for example, the accuracy of the work is improved, and as a result, the reliability of the energy storage apparatus 1a is improved.

In the energy storage apparatus 1a according to the present embodiment, a plurality of ribs 113 are provided on the inner surface 112a of the outer case body 112 as illustrated in FIGS. 9 and 10A, for example. The pins 115 are provided on the upper end of a part of the plurality of ribs 113. That is, in the present embodiment, the outer case body 112 is erected on the inner surface 112a located beside the energy storage devices 2, and has ribs 113 extending in the alignment direction (Z direction in the present embodiment) of the inner lid 117 and the outer case body 112. The pins 115 are erected on an end portion of the ribs 113 on the inner lid 117 side. The plurality of ribs 113 in the present embodiment are an example of the extension portion.

By providing the ribs 113 on the inner surface 112a of the outer case body 112 in this manner, the strength of the outer case body 112 is improved. In this way, the pin 115 is provided on an upper end of the ribs 113 extending in a direction parallel to the projecting direction of the pins 115, so that the inner lid 117 is supported by the ribs 113. Therefore, the inner lid 117 is more stably supported by the outer case body 112. This contributes to improvement of the reliability of the energy storage apparatus 1a.

In the energy storage apparatus 1a according to the present embodiment, the plurality of pins 115 are provided on the outer case body 112, and the plurality of pins 115 are disposed at positions that do not have rotational symmetry with respect to the center of the outer case body 112 when viewing the outer case body 112 in plan. Specifically, in a substantially rectangular outer case body 112 in plan view as illustrated in FIG. 10A, the eight pins 115 (pins 115a to 115h in FIG. 10A) are disposed at positions that do not have rotational symmetry with respect to a center point Pa of the outer case body 112. In other words, the positions of the eight pins 115 coincide before and after rotation only when the outer case body 112 is rotated about the center point Pa by an integral multiple of 360°. Consequently, the same applies to the eight holes 118 into which the eight pins 115 are inserted. That is, in the substantially rectangular inner lid 117 in plan view as illustrated in FIG. 10B, the eight holes 118 (holes 118a to 118h in FIG. 10B) are disposed at positions that do not rotational symmetry with respect to a center point Pb of the inner lid 117. In other words, the positions of the eight holes 118 coincide before and after the rotation only when the inner lid 117 is rotated about the center point Pb by an integral multiple of 360°.

In the present embodiment, the inner lid 117 has a substantially rectangular shape in plan view as described above. Therefore, when disposing the inner lid 117 at the outer case body 112 having the posture illustrated in FIG. 10A, for example, it is not easy to immediately determine whether the inner lid 117 is to be disposed in the orientation (posture) illustrated in FIG. 10B or to be disposed in the orientation (posture) rotated by 180° about the center point Pb, focusing on the outer shape of the inner lid 117. That is, in a case where the shape of the inner lid in plan view to be disposed on the outer case body 112 is a shape that is rotationally symmetric by a predetermined angle (e.g., 360°/N (N is an integer of 2 or more)) such as a rectangle, a regular polygon, or an ellipse, the outer shape makes it difficult to determine in which orientation (posture) the inner lid is to be disposed on the outer case body 112. Furthermore, in the present embodiment, the inner lid disposed on the outer case body 112 is the inner lid 117 that holds the plurality of bus bars 133, and the positions of the plurality of electrode terminals 22 provided at the plurality of energy storage devices 2 are also rotationally symmetric positions at every 180° as with the inner lid 117. That is, even when the inner lid 117 is rotated 180° about the center point Pb from the normal posture, two or more joinable electrode terminals 22 exist immediately below each of the bus bars 133. Consequently, if the inner lid 117 in a state rotated 180° from the normal posture is disposed on the outer case body 112 (that is, if misplacement occurs), the work of joining the bus bar 133 and the electrode terminal 22 becomes possible, and accordingly a manufacturing error may occur. Consequently, suppression of misplacement of the inner lid 117 is important from the viewpoint of improving the production efficiency of the energy storage apparatus 1a.

In this regard, in the present embodiment, the one-to-one relationship between the plurality of pins 115 of the outer case body 112 and the plurality of holes 118 of the inner lid 117 is uniquely determined. That is, by comparing the arrangement layout of the plurality of holes 118 in the inner lid 117 with the arrangement layout of the plurality of pins 115 in the outer case body 112, it is possible to easily determine in which orientation (posture) the inner lid 117 is to be disposed on the outer case body 112. That is, the possibility of misplacement of the inner lid 117 with respect to the outer case body 112 is reduced. Therefore, an event such as lowering of the manufacturing efficiency due to misplacement or damage to a member due to misplacement, which may cause lowering of the reliability of the energy storage apparatus 1a, is unlikely to occur.

The above effects are similarly obtained when the outer case body 112 has a plurality of holes 118 and the inner lid 117 has a plurality of pins 115. That is, in a case where the plurality of pins 115 are provided on the inner lid 117 and the plurality of pins 115 are disposed at positions that do not have rotational symmetry with respect to the center of the inner lid 117 in plan view, the possibility of misplacement of the inner lid 117 with respect to the outer case body 112 is reduced.

In the present embodiment, two bus bar covers 160 and 170 are disposed corresponding to the plurality of bus bars 133 aligned in two rows as illustrated in FIG. 8, for example, and both of these two bus bar covers 160 and 170 have long and similar shapes. Consequently, for example, it is not easy to determine which of the bus bar covers 160 and 170 is to be disposed on the plus side (or minus side) in the Y direction in the outer case body 112 in the posture illustrated in FIG. 10A, for example, based on the outer shape of the bus bar covers 160 and 170. However, the arrangement layout of the holes 165g and 165f in the bus bar cover 160 and the arrangement layout of the holes 175b and 175c in the bus bar cover 170 are obviously different. Specifically, the holes 175b and 175c in the bus bar cover 170 are disposed relatively close to each other, while the holes 165g and 165f in the bus bar cover 160 are disposed relatively far from each other. Therefore, comparing the arrangement layout of the plurality of holes in each of the bus bar covers 160 and 170 with the arrangement layout of the plurality of pins 115 in the outer case body 112, it can be easily judged that the bus bar cover 170 is to be disposed on the plus side in the Y direction. That is, the possibility of misplacement of the bus bar covers 160 and 170 with respect to the outer case body 112 is reduced. Therefore, an event such as lowering of the manufacturing efficiency due to misplacement or damage to a member due to misplacement, which may cause lowering of the reliability of the energy storage apparatus 1a, is unlikely to occur.

Although the energy storage apparatus 1a according to the second embodiment has been described above, the outer case 110 provided in the energy storage apparatus 1a may include a pin or a hole of a form different from the form illustrated in FIGS. 9 to 11. Thus, the following description will explain a modification example of a pin and a hole for coupling the outer case body and the inner lid in the outer case 110, focusing on differences from the above second embodiment.

MODIFICATION EXAMPLE

Figure 12A:
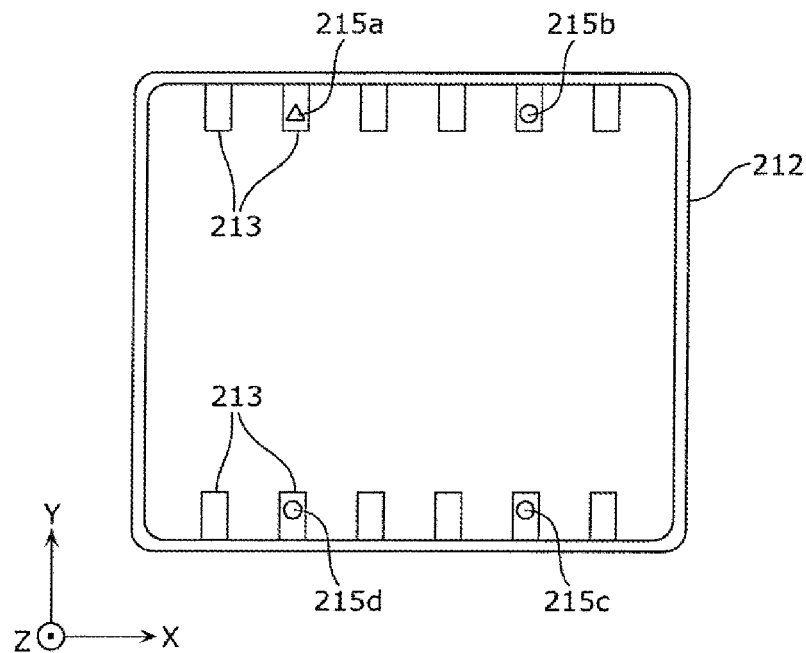
FIG. 12A is a plan view of an outer case body of an outer case according to a modification example of the second embodiment.
Figure 12B:
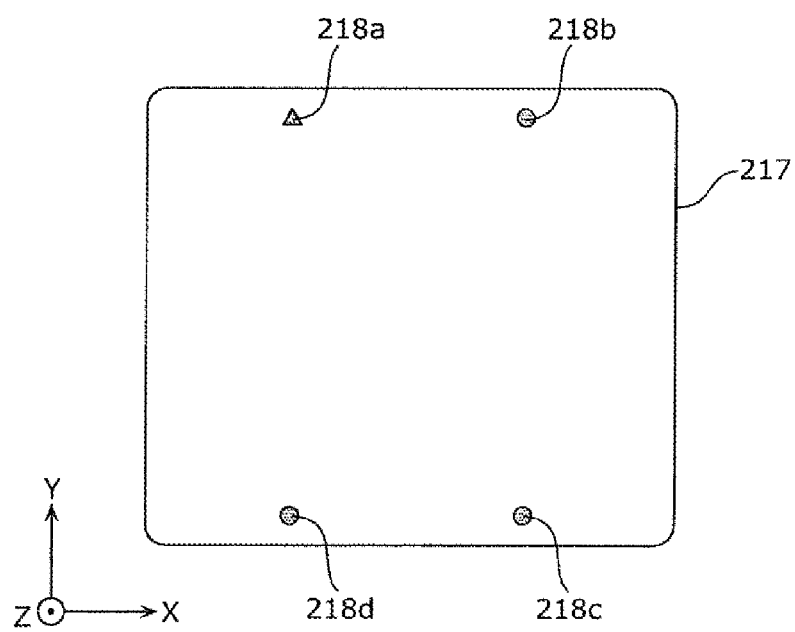
FIG. 12B is a plan view of a bus bar plate of the outer case according to the modification example of the second embodiment.

FIG. 12A is a plan view of an outer case body 212 of an outer case according to a modification example of the second embodiment. FIG. 12B is a plan view of an inner lid 217 of the outer case according to the modification example of the second embodiment. In order to clearly show the arrangement positions and shapes of the pins and holes, illustrations other than the structures related to the pins and holes are omitted, and the overall shapes of the outer case body 212 and the inner lid 217 are schematically illustrated in FIGS. 12A and 12B. In FIG. 12B, dots are drawn at the regions of the plurality of holes formed at the inner lid 217.

The outer case body 212 illustrated in FIG. 12A is a member that accommodates a plurality of energy storage devices 2 as with the outer case body 112 according to the second embodiment, and the inner lid 217 illustrated in FIG. 12B is an example of an inner lid disposed above the plurality of energy storage devices 2 as with the inner lid 117 according to the second embodiment. That is, the outer case 110 according to the present modification example includes the outer case body 212 and the inner lid 217.

In the present modification example, the outer case body 212 has four pins 215a to 215d, and each of these four pins 215a to 215d is disposed at the upper end of ribs 213. The inner lid 217 has four holes 218a to 218d. A pin denoted by the same alphabet as one of these four holes 218a to 218d is inserted into this hole. For example, the pin 215a is inserted into the hole 218a, and the pin 215b is inserted into the hole 218b. Furthermore, a tip portion of each pin is heat-caulked with the pin penetrating a hole.

These four pins 215a to 215d are disposed at positions that have rotational symmetry in plan view. That is, the four holes 218a to 218d corresponding to the four pins 215a to 215d are similarly disposed at positions of the inner lid 217 that have rotational symmetry in plan view. However, in this modification example, the shape of the pin 215a among the pins 215a to 215d is different from the other pins 215b to 215d. That is, the shape of the hole 218a corresponding to the pin 215a is different from the other holes 218b to 218d. Consequently, when disposing the inner lid 217 on the outer case body 212, it is easy to associate the pin 215a and the hole 218a with each other, and as a result, it is also possible to determine the orientation (posture) of the inner lid 217 with respect to the outer case body 212.

As described above, in this modification example, the outer case body 212 is provided with the plurality of pins 215a to 215d, and the shape of one pin 215a among the plurality of pins 215a to 215d in plan view is different from the shape of the other pins 215b to 215d in plan view.

With this configuration where a combination of one of the plurality of pins and one of the plurality of holes is uniquely determined, it is easy to determine the orientation (posture) of the inner lid 217 with respect to the outer case body 212 when the inner lid 217 is disposed on the outer case body 212. That is, in a case where the shape of the inner lid 217 in plan view is a shape having rotational symmetry at every predetermined angle as illustrated in FIG. 12B, the possibility of misplacement of the inner lid 217 is reduced. Therefore, an event such as lowering of the manufacturing efficiency due to misplacement or damage to a member due to misplacement, which may cause lowering of the reliability of the energy storage apparatus 1a, is unlikely to occur.

The size or the posture of one pin 215a among the plurality of pins 215a to 215d in plan view may be different from the size or the posture of the other pins 215b to 215d. For example, assume that all of the plurality of pins 215a to 215d have an equilateral triangle shape in plan view as with the pin 215a. In this case, it is easy to identify the combination of the pin 215a and the hole 218a when the posture of the pin 215a is such that the vertices of the equilateral triangle in plan view face the plus side in the Y direction, and the postures of the other pins 215b to 215d are such that the vertices of the equilateral triangle in plan view face the minus side in the Y direction. The same applies when the size of the pin 215a differs from the size of the other pins 215b to 215d in plan view.

The shape in plan view, the size, or the posture of one pin 215a among the plurality of pins 215a to 215d does not have to be different from the shape in plan view, the size, or the posture of all of the other pins 215b to 215d. For example, the shape of the pin 215a in plan view may be the same as the shape of the pin 215b or 215d in plan view, and may be different from the shape of the other two pins in plan view. In this case, it is also easy to determine the orientation (posture) of the inner lid 217 with respect to the outer case body 212.

The shape of each of the plurality of pins 215a to 215d in plan view may be different from all other pins. That is, each of the plurality of pins 215a to 215d may have a unique shape in plan view. In this case, it is also easy to determine the orientation (posture) of the inner lid 217 with respect to the outer case body 212.

(Other Embodiments Related to Second Embodiment)

The energy storage apparatus according to the present invention has been described above based on the second embodiment and a modification example thereof. However, the present invention is not limited to the above second embodiment and modification example. Without departing from the gist of the present invention, forms obtained by applying various changes that can be made by those skilled in the art to the above second embodiment or modification, and forms constructed by combining a plurality of the above-described components may also be included in the scope of the present invention.

In the second embodiment, the inner lid 117 may also be bonded to the plurality of energy storage devices 2 as in the first embodiment. Accordingly, the inner lid 117 functions as a member that restrains the plurality of energy storage devices 2. This is significant when the plurality of energy storage devices 2 aligned in the outer case body 112 are not restrained in the alignment direction. The inner lid 117 is temporarily fixed to the outer case body 112 by inserting pins 115 of one of the inner lid 117 and the outer case body 112 into holes 118 of the other. Consequently, when the inner lid 117 and the plurality of energy storage devices 2 are bonded to each other, the inner lid 117 can be temporarily fixed without using a jig until the adhesive is solidified.

Although there are a plurality of combinations of pins and holes that couple the outer case body and the inner lid in the second embodiment and the modification example, only one combination may be provided. For example, in a case where only one pin is provided on the outer case body and only one hole is provided on the inner lid and the position of the pin is a position other than the center of the outer case body in plan view, the position of the pin is surely a position that does not have rotational symmetry with respect to the center of the outer case body. The position of the hole at the inner lid is also surely a position that does not have rotational symmetry with respect to the center of the inner lid. Consequently, even when the shape of the inner lid in plan view has rotational symmetry at every predetermined angle (other than 360°), misplacement of the inner lid with respect to the outer case body does not occur. In this case, regarding a part different from the arrangement position of the pin and the hole, the outer case body and the inner lid may be coupled by predetermined means such as bonding, fitting, welding, or screwing.

For example, in a case where the inner lid has a substantially rectangular shape in plan view and the number of combinations of pins and holes is an odd number, misplacement of the inner lid with respect to the outer case body does not occur. That is, the inner lid has a substantially rectangular shape in plan view, and N (N is a positive odd number) pins may be provided on one of the outer case body and the inner lid. To give a specific example, for example, assume that the shape of the inner lid in plan view is a shape that is recognized as a rectangle as a whole, and the peripheral edge of the inner lid has three holes into which the pins of the outer case body are inserted. That is, assume that only three pins are disposed at positions of the outer case body facing the peripheral edge of the inner lid. In this case, the inner lid has rotational symmetry at every 180°, while it is impossible to dispose the three pins on the outer case body so as to have rotational symmetry at every 180°. That is, the arrangement positions of the three pins at the outer case body are positions that do not have rotational symmetry at every 180°, and accordingly misplacement of the inner lid with respect to the outer case body does not occur.

Although the plurality of pins are disposed in a distributed manner only at peripheral edges of the outer case body on the plus side and the minus side in the Y direction (i.e., peripheral edges parallel to the X direction) in plan view in the second embodiment and the modification example, the arrangement position of the pin is not limited to this. For example, one or more pins may be disposed only on a peripheral edge on any one of the plus side and the minus side of the outer case body in the Y direction in plan view. For example, one or more pins may be disposed on each of a peripheral edge of the outer case body on any one of the plus side and the minus side in Y direction, and a peripheral edge of the outer case body on any one of the plus side and the minus side in the X direction. For example, only one pin may be provided on each of peripheral edges of the outer case body on the plus side and the minus side in the Y direction (or the plus side and the minus side in the X direction). That is, only two sets of combinations of pins and holes may be used to couple the outer case body and the inner lid, and, in this case, these two sets may be disposed at positions facing each other in plan view. Accordingly, for example, the stability of the inner lid with respect to the outer case body is improved.

That is, the position of the combination of the pin and the hole disposed on the outer case body and the inner lid may be appropriately determined in consideration of, for example, the stability after the inner lid and the outer case body are coupled, the ease of heat caulking work, or the like. As described above, the arrangement positions of the combinations of one or more pins and holes is judged in consideration of matters such as arranging a plurality of pins at positions that do not have rotational symmetry in plan view, so that an effect of suppressing misplacement of the inner lid with respect to the outer case body can be obtained.

In the second embodiment and the modification example, the inner lid coupled to the outer case body by the combination of the pin and the hole is a bus bar plate. However, the inner lid coupled to the outer case may be a member different from the bus bar plate as long as the member extends over the opening of the outer case body.

In the second embodiment, the lid 111 disposed above the inner lid 117 may be realized as an inner lid that is coupled to the outer case body by the combination of pins and holes. That is, a pin provided on one of the outer case body 112 and the lid 111 is penetrated through a hole provided on the other and a tip portion is heat-caulked, so that the lid 111 can be coupled to the outer case body 112.

A tray or a frame that does not hold the plurality of bus bars 133 and holds electric devices such as a control board may be treated as an inner lid that is coupled to the outer case body using a combination of a pin and a hole. A member that does not have a role of holding any member and is disposed above the plurality of energy storage devices 2 to restrict upward movement of the plurality of energy storage devices 2 may be treated as an inner lid. That is, an inner lid that is coupled to the outer case body using a combination of a pin and a hole does not have to have a shape that completely covers the plurality of energy storage devices 2. For example, any member that extends from one end to the other end of an opening of an outer case body, which is located above the plurality of energy storage devices 2, in a predetermined direction in plan view can be treated as an inner lid that is coupled to the outer case body using a combination of a pin and a hole. In other words, any member that is disposed across the space of a region facing the plurality of energy storage devices 2 above the plurality of energy storage devices 2 can be treated as an inner lid that is coupled to the outer case body using a combination of a pin and a hole. That is, it is possible to obtain a highly reliable energy storage apparatus by providing a pin on one of the member and the outer case body, and heat-caulking a tip portion of the pin with the pin penetrating a hole provided on the other.

The outer case provided at the energy storage apparatus 1a does not have to have a box shape that covers the plurality of energy storage devices 2 from the entire circumference. For example, the outer case body of the outer case may be composed of end plates disposed on both sides in the array direction of the plurality of energy storage devices 2 (X direction in the second embodiment), and a connecting member that connects these end plates. In this case, for example, a plurality of pins are provided on an upper end of the connecting member, and a plurality of holes are provided at the bus bar plate. Furthermore, the tip portion is heat-caulked with each of the plurality of pins penetrating a hole. By such a process, it is also possible to firmly couple the bus bar plates as the inner lid disposed above the plurality of energy storage devices 2 to the outer case body (combination of the pair of end plates and the connecting member).

A form constructed by arbitrarily combining the components included in the first and second embodiments and modification example thereof is also included in the scope of the present invention.

INDUSTRIAL APPLICABILITY

The present invention can be applied to an energy storage apparatus including an energy storage device such as a lithium ion secondary battery.

DESCRIPTION OF REFERENCE SIGNS

1: energy storage apparatus
2: energy storage device
2a: positive electrode terminal
2b: negative electrode terminal
3, 110: outer case
10, 112, 212: outer case body
11: bottom wall
12a, 12b: first side wall
13A, 13B: second side wall
14a, 14b: extension portion
15, 113, 213: rib
16a, 16b: first fixing portion
17: first pin
17a, 116: head
18: second pin
20, 111: lid
21: case
22: electrode terminal
30, 117, 217: inner lid
31a, 31b: second fixing portion
32: first insertion hole
33: second insertion hole
40, 133: bus bar
50, 160, 170: bus bar cover
51: third insertion hole
52: notch
60: fixing portion
70: joint portion
80: hot plate 91, 92: external terminal
115, 115a to 115h, 215a to 215d: pin
117a: bus bar opening
118, 118a to 118h, 165f, 165g, 175b, 175c, 218a to 218d: hole
166e, 166h, 176a, 176d: opening
180: connection unit The invention claim is:
1. An energy storage apparatus comprising:
a plurality of energy storage device;
an outer case including a box-shaped outer case body that accommodates the plurality of energy storage devices inside an opening of the outer case, and a lid that covers one side of the outer case body in a predetermined direction; and
a substantially plate-shaped inner lid disposed on one side of an end of an energy storage device of the plurality of energy storage devices in the predetermined direction,
wherein the outer case body includes:
a pair of first side walls facing each other;
a pair of second side walls that face each other and connect the pair of first side walls to each other; and
a pair of first fixing portions that are respectively provided on the pair of first sidewalls and attach the inner lid,
the opening of the outer case if formed by peripheral edges of the pair of first side walls and peripheral edges of the pair of second side walls,
the inner lid includes a pair of second fixing portions that are respectively connected with the pair of first fixing portions and are arranged at a predetermined distance from each other, and
the outer case body and the inner lid are fixed by connecting the pair of first fixing portions and the pair of second fixing portions to each other.
2. The energy storage apparatus according to claim 1, wherein
the outer case body includes a bottom wall having a substantially quadrangular shape and connected to the pair of first side walls and the pair of second side walls, anad
the pair of first side walls comprise walls extending along an array direction of a plurality of the energy storage devices, or walls extending in a direction orthogonal to the array direction.
3. The energy storage apparatus according to claim 1, wherein the pair of first fixing portions are respectively disposed in central portions of the pair of first side walls in a direction in which the pair of first side walls extend in a cross section intersecting the predetermined direction.
4. The energy storage apparatus according to claim 1, wherein
the pair of first side walls include a pair of extension portions respectively extending from inner surfaces of the pair of first side walls, and
the pair of first fixing portions are respectively provided in the pair of extension portions.
5. The energy storage apparatus according to claim 4, wherein the pair of extension portions comprise reinforcing ribs provided on the outer case body.
6. The energy storage apparatus according to claim 1, further comprising a joint portion in which the outer case body and the lid are heat-welded,
wherein the pair of first fixing portions provided on the pair of first side walls, and the pair of second fixing portions provided on the inner lid form a fixing portion of the outer case body and the inner lid, and a position of the fixing portion on a side of the lid in the predetermined direction is located closer to the energy storage device than the joint portion.

7. The energy storage apparatus according to claim 1, wherein
one of the pair of first fixing portions and the pair of second fixing portions include a pin while an other include an insertion hole, and
a tip portion of the pin is heat-caulked with the pin penetrating the insertion hole.

8. The energy storage apparatus according to claim 7, wherein
the pair of second fixing portions including the insertion hole are formed in a peripheral edge of the inner lid, and
the pair of first fixing portions including the pin are formed at a position of the outer case body facing the peripheral edge of the inner lid so as to project toward the inner lid.

9. The energy storage apparatus according to claim 7, wherein
a plurality of the pins are provided on one of the pair of first fixing portions and the pair of second fixing portions, and
the plurality of pins are disposed at positions that do not have rotational symmetry with respect to a center of one of the outer case body and the inner lid when viewing the one in plan.

10. The energy storage apparatus according to claim 7, wherein
a plurality of the pins are provided on one of the pair of first fixing portions and the pair of second fixing portions, and
a shape in plan view, a size, or a posture of one of the plurality of pins is different from a shape in plan view, a size, or a posture of one or more other pins.

11. The energy storage apparatus according to claim wherein
the inner lid has a substantially rectangular shape in plan view, and
one of the pair of first fixing portions and the pair of second fixing portions are provided with N (N is a positive odd number) pins.

12. The energy storage apparatus according to claim 1, wherein the inner lid and the energy storage device are bonded to each other.

13. The energy storage apparatus according to claim 1, wherein the first fixing portion is disposed so as not to overlap with the energy storage device when viewed from a direction where the pair of the second side walls face each other.

14. An energy storage apparatus comprising:
an energy storage device;
an outer case including a box-shaped outer case body that accommodates the energy storage device, and a lid that covers one side of the outer case body in a predetermined direction; and
a substantially plate-shaped inner lid disposed on one side of an end of the energy storage device on the one side in the predetermined direction,
wherein the outer case body includes:
a pair of first side walls facing each other;
a pair of second side walls that face each other and connect the pair of first side walls to each other; and
a pair of first fixing portions that are respectively provided on the pair of first sidewalls and attach the inner lid,
the inner lid includes a pair of second fixing portions that are respectively connected with the pair of first fixing portions and are arranged at a predetermined distance from each other,
the outer case body and the inner lid are fixed by connecting the pair of first fixing portions and the pair of second fixing portions to each other,
the pair of first side walls include a pair of extension portions respectively extending from each inner surfaces of the pair of first side walls,
the pair of extension portions respectively extend from one of the pair of first side walls toward an other of the pair of first side walls, and
the pair of first fixing portions are respectively provided in the pair of extension portions.

15. The energy storage apparatus according to claim 14, wherein the inner lid and the energy storage device are bonded to each other.

16. The energy storage apparatus according to claim 14, wherein one of the pair of first fixing portions and the pair of second fixing portions include a pin while an other include an insertion hole, and
a tip portion of the pin is heat-caulked with the pin penetrating the insertion hole.

17. The energy storage apparatus according to claim 14, wherein the first fixing portion is disposed so as not to overlap with the energy storage device when viewed from a direction where the pair of the second side walls face each other.

18. An energy storage apparatus comprising:
an energy storage device;
an outer case including a box-shaped outer case body that accommodates the energy storage device, and a lid that covers one side of the outer case body in a predetermined direction; and
a substantially plate-shaped inner lid disposed on one side of an end of the energy storage device in the predetermined direction,
wherein the outer case body includes:
a pair of first side walls facing each other;
a pair of second side walls that face each other and connect the pair of first side walls to each other; and
a pair of first fixing portions that are respectively provided on the pair of first sidewalls and attach the inner lid,
the inner lid includes a pair of second fixing portions that are respectively connected with the pair of first fixing portions and are arranged at a predetermined distance from each other,
the outer case body and the inner lid are fixed by connecting the pair of first fixing portions and the pair of second fixing portions to each other, and
wherein one of the pair of first fixing portions and the pair of second fixing portions include a pin while an other include an insertion hole.

19. The energy storage apparatus according to claim 18, wherein the inner lid and the energy storage device are bonded to each other.

20. The energy storage apparatus according to claim 18, wherein a tip portion of the pin is heat-caulked with the pin penetrating the insertion hole.

* * * * *